(12) United States Patent
Mertens et al.

(10) Patent No.: US 11,488,602 B2
(45) Date of Patent: Nov. 1, 2022

(54) MEETING TRANSCRIPTION USING CUSTOM LEXICONS BASED ON DOCUMENT HISTORY

(71) Applicant: Dropbox, Inc., San Francisco, CA (US)

(72) Inventors: Timo Mertens, Millbrae, CA (US); Bradley Neuberg, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/900,414

(22) Filed: Feb. 20, 2018

(65) Prior Publication Data

US 2019/0259387 A1 Aug. 22, 2019

(51) Int. Cl.
| | |
|---|---|
| *G10L 15/26* | (2006.01) |
| *G10L 15/197* | (2013.01) |
| *G06Q 10/10* | (2012.01) |
| *G06F 40/166* | (2020.01) |
| *G06F 40/169* | (2020.01) |
| *G10L 15/183* | (2013.01) |

(52) U.S. Cl.
CPC ............ *G10L 15/26* (2013.01); *G06F 40/166* (2020.01); *G06F 40/169* (2020.01); *G06Q 10/103* (2013.01); *G10L 15/183* (2013.01); *G10L 15/197* (2013.01)

(58) Field of Classification Search
None
See application file for complete search history.

(56) References Cited

U.S. PATENT DOCUMENTS

| 5,384,703 A | 1/1995 | Withgott et al. |
| 5,664,227 A | 9/1997 | Mauldin et al. |

(Continued)

FOREIGN PATENT DOCUMENTS

| EP | 0899952 A2 | 3/1999 |
| EP | 2677743 A1 | 12/2013 |

OTHER PUBLICATIONS

Shin, H. V. et al., "Dynamic Authoring of Audio with linked Scripts," UIST 2016, Oct. 16-19, 2016, pp. 509-516.

(Continued)

*Primary Examiner* — Matthew Ell
*Assistant Examiner* — Samuel Shen
(74) *Attorney, Agent, or Firm* — Fenwick & West LLP

(57) ABSTRACT

A collaborative content management system allows multiple users to access and modify collaborative documents. When audio data is recorded by or uploaded to the system, the audio data may be transcribed or summarized to improve accessibility and user efficiency. Text transcriptions are associated with portions of the audio data representative of the text, and users can search the text transcription and access the portions of the audio data corresponding to search queries for playback. An outline can be automatically generated based on a text transcription of audio data and embedded as a modifiable object within a collaborative document. The system associates hot words with actions to modify the collaborative document upon identifying the hot words in the audio data. Collaborative content management systems can also generate custom lexicons for users based on documents associated with the user for use in transcribing audio data, ensuring that text transcription is more accurate.

19 Claims, 13 Drawing Sheets

(56) References Cited

U.S. PATENT DOCUMENTS

| | | | |
|---|---|---|---|
| 5,884,258 | A | 3/1999 | Rozak et al. |
| 6,289,304 | B1 | 9/2001 | Grefenstette |
| 6,298,326 | B1 | 10/2001 | Feller |
| 6,415,258 | B1 | 7/2002 | Reynar et al. |
| 6,473,778 | B1 | 10/2002 | Gibbon |
| 6,789,228 | B1 | 9/2004 | Merril et al. |
| 6,795,806 | B1 | 9/2004 | Lewis et al. |
| 7,280,738 | B2 | 10/2007 | Kauffman et al. |
| 7,458,013 | B2 | 11/2008 | Fruchter et al. |
| 8,095,120 | B1 | 1/2012 | Blair et al. |
| 8,447,608 | B1* | 5/2013 | Chang .................. G10L 15/197 704/257 |
| 8,670,977 | B2 | 3/2014 | Saraclar et al. |
| 8,712,776 | B2 | 4/2014 | Bellegarda et al. |
| 8,745,501 | B2 | 6/2014 | Krantz et al. |
| 8,862,467 | B1 | 10/2014 | Casado et al. |
| 9,251,532 | B2 | 2/2016 | Ho |
| 9,275,635 | B1* | 3/2016 | Beaufays ................ G10L 15/32 |
| 9,560,152 | B1 | 1/2017 | Jamdar et al. |
| 9,641,563 | B1 | 5/2017 | Kitada et al. |
| 9,672,827 | B1 | 6/2017 | Jheeta |
| 9,785,707 | B2 | 10/2017 | Bayer et al. |
| 10,129,392 | B1 | 11/2018 | Hodge |
| 10,229,148 | B1* | 3/2019 | Nguyen ................ G06N 20/00 |
| 10,248,626 | B1 | 4/2019 | Zhang et al. |
| 10,382,370 | B1 | 8/2019 | Labarre et al. |
| 2002/0103864 | A1 | 8/2002 | Rodman et al. |
| 2002/0107853 | A1 | 8/2002 | Hofmann et al. |
| 2002/0116291 | A1 | 8/2002 | Grasso et al. |
| 2003/0158724 | A1 | 8/2003 | Uchida |
| 2004/0250201 | A1 | 12/2004 | Caspi |
| 2005/0039114 | A1 | 2/2005 | Naimat et al. |
| 2005/0076328 | A1 | 4/2005 | Berenbach et al. |
| 2005/0144179 | A1* | 6/2005 | Maruhashi ............. G06F 16/38 |
| 2006/0167994 | A1 | 7/2006 | Chen et al. |
| 2007/0078930 | A1 | 4/2007 | Ludwig et al. |
| 2007/0240060 | A1 | 10/2007 | Berenbach et al. |
| 2007/0260968 | A1 | 11/2007 | Howard et al. |
| 2007/0299665 | A1 | 12/2007 | Koll et al. |
| 2008/0059152 | A1 | 3/2008 | Fridman et al. |
| 2008/0086305 | A1 | 4/2008 | Lewis et al. |
| 2008/0120101 | A1 | 5/2008 | Johnson et al. |
| 2008/0228479 | A1 | 9/2008 | Prado |
| 2009/0083256 | A1 | 3/2009 | Thompson et al. |
| 2009/0144051 | A1 | 6/2009 | Lee et al. |
| 2009/0150827 | A1 | 6/2009 | Meyer et al. |
| 2009/0177469 | A1 | 7/2009 | Findlay |
| 2009/0177511 | A1 | 7/2009 | Shaw et al. |
| 2009/0260060 | A1 | 10/2009 | Smith et al. |
| 2010/0095198 | A1* | 4/2010 | Bultrowicz ........... G06F 40/169 715/255 |
| 2010/0158213 | A1 | 6/2010 | Mikan et al. |
| 2010/0241512 | A1 | 9/2010 | Tirpak et al. |
| 2010/0246784 | A1 | 9/2010 | Frazier et al. |
| 2010/0284310 | A1 | 11/2010 | Shaffer et al. |
| 2011/0013756 | A1 | 1/2011 | Davies et al. |
| 2011/0043602 | A1 | 2/2011 | Lee |
| 2011/0099006 | A1 | 4/2011 | Sundararaman et al. |
| 2011/0167357 | A1 | 7/2011 | Benjamin et al. |
| 2011/0268263 | A1 | 11/2011 | Jones et al. |
| 2011/0271205 | A1 | 11/2011 | Jones et al. |
| 2011/0296374 | A1 | 12/2011 | Wu et al. |
| 2011/0320958 | A1 | 12/2011 | Kashi |
| 2012/0069134 | A1 | 3/2012 | Garcia, Jr. et al. |
| 2012/0128146 | A1 | 5/2012 | Boss et al. |
| 2012/0131060 | A1 | 5/2012 | Heidasch |
| 2012/0166924 | A1 | 6/2012 | Larson et al. |
| 2012/0254318 | A1 | 10/2012 | Poniatowskl |
| 2012/0311090 | A1 | 12/2012 | Locker et al. |
| 2012/0323572 | A1 | 12/2012 | Koll et al. |
| 2012/0323575 | A1 | 12/2012 | Gibbon et al. |
| 2013/0055076 | A1 | 2/2013 | Assadollahi |
| 2013/0058471 | A1 | 3/2013 | Garcia |
| 2013/0144603 | A1 | 6/2013 | Lord et al. |
| 2013/0151233 | A1 | 6/2013 | Gande et al. |
| 2014/0009677 | A1 | 1/2014 | Homyack et al. |
| 2014/0108544 | A1 | 4/2014 | Lewis et al. |
| 2014/0163977 | A1* | 6/2014 | Hoffmeister ............ G10L 15/32 704/232 |
| 2014/0244252 | A1 | 8/2014 | Dines et al. |
| 2014/0325335 | A1 | 10/2014 | Paulik et al. |
| 2014/0337346 | A1 | 11/2014 | Barthel et al. |
| 2014/0359559 | A1 | 12/2014 | Qi et al. |
| 2015/0002611 | A1 | 1/2015 | Thapliyal et al. |
| 2015/0003595 | A1 | 1/2015 | Yaghi et al. |
| 2015/0006152 | A1 | 1/2015 | Dong et al. |
| 2015/0012270 | A1 | 1/2015 | Reynolds |
| 2015/0012844 | A1 | 1/2015 | Paulik et al. |
| 2015/0016661 | A1 | 1/2015 | Lord |
| 2015/0011341 | A1 | 4/2015 | Bradley et al. |
| 2015/0120302 | A1 | 4/2015 | McCandless et al. |
| 2015/0142800 | A1 | 5/2015 | Thapliyal |
| 2015/0149540 | A1 | 5/2015 | Barker et al. |
| 2016/0019202 | A1 | 1/2016 | Adams et al. |
| 2016/0026716 | A1 | 1/2016 | Yeager et al. |
| 2016/0027442 | A1 | 1/2016 | Burton et al. |
| 2016/0065742 | A1 | 3/2016 | Nasir et al. |
| 2016/0117624 | A1 | 4/2016 | Flores et al. |
| 2016/0165044 | A1 | 6/2016 | Chan |
| 2016/0239272 | A1 | 8/2016 | Petri |
| 2016/0275952 | A1 | 9/2016 | Kashtan et al. |
| 2016/0357749 | A1 | 12/2016 | Fan et al. |
| 2017/0011740 | A1 | 1/2017 | Gauci |
| 2017/0046339 | A1 | 2/2017 | Bhat et al. |
| 2017/0046659 | A1 | 2/2017 | Inomata et al. |
| 2017/0060230 | A1 | 3/2017 | Faaborg et al. |
| 2017/0132208 | A1* | 5/2017 | Adavelli ............... G06F 40/242 |
| 2017/0163813 | A1 | 6/2017 | Young et al. |
| 2017/0169816 | A1 | 6/2017 | Blandin et al. |
| 2017/0177928 | A1 | 6/2017 | Cunico et al. |
| 2017/0186432 | A1* | 6/2017 | Aleksic ............... G10L 15/1815 |
| 2017/0293618 | A1 | 10/2017 | Gorrepati |
| 2017/0315985 | A1 | 11/2017 | Fitterer et al. |
| 2018/0011908 | A1 | 1/2018 | Aggarwal et al. |
| 2018/0018959 | A1 | 1/2018 | Des Jardins et al. |
| 2018/0077099 | A1 | 3/2018 | Silva et al. |
| 2018/0090154 | A1 | 3/2018 | Aaron et al. |
| 2018/0101761 | A1 | 4/2018 | Nelson et al. |
| 2018/0130496 | A1 | 5/2018 | Mahapatra et al. |
| 2018/0143956 | A1* | 5/2018 | Skarbovsky ............ G10L 15/26 |
| 2018/0158365 | A1 | 6/2018 | Roche |
| 2018/0160200 | A1 | 6/2018 | Goel et al. |
| 2018/0191907 | A1 | 7/2018 | Herrin et al. |
| 2018/0315429 | A1 | 11/2018 | Taple et al. |
| 2018/0315438 | A1 | 11/2018 | Davies et al. |
| 2018/0336001 | A1 | 11/2018 | Abuelsaad et al. |
| 2018/0342237 | A1 | 11/2018 | Lee et al. |
| 2018/0349086 | A1 | 12/2018 | Chakra et al. |
| 2018/0365232 | A1* | 12/2018 | Lewis ..................... G06F 40/58 |
| 2019/0005023 | A1* | 1/2019 | Olsen .................... G06F 40/134 |
| 2019/0051301 | A1 | 2/2019 | Locascio et al. |
| 2019/0068477 | A1 | 2/2019 | Faulkner |
| 2019/0095803 | A1 | 3/2019 | Raskovic et al. |
| 2019/0139543 | A1 | 5/2019 | Rahmel et al. |
| 2019/0179501 | A1* | 6/2019 | Seeley .................. G06F 3/0482 |
| 2019/0200121 | A1 | 6/2019 | Sinkov et al. |
| 2019/0220177 | A1 | 7/2019 | Guido et al. |
| 2019/0341050 | A1 | 11/2019 | Diamant et al. |
| 2020/0092339 | A1 | 3/2020 | Rakshit et al. |
| 2020/0186958 | A1 | 6/2020 | Husain et al. |
| 2020/0211537 | A1 | 7/2020 | Scheiner et al. |
| 2020/0211561 | A1 | 7/2020 | Degraye et al. |
| 2020/0228358 | A1 | 7/2020 | Rampton |
| 2020/0251089 | A1 | 8/2020 | Pinto |
| 2020/0251116 | A1 | 8/2020 | Sachdev et al. |
| 2020/0273453 | A1 | 8/2020 | Mody et al. |
| 2020/0296176 | A1 | 9/2020 | Bastide et al. |
| 2020/0394935 | A1 | 12/2020 | Ray et al. |

OTHER PUBLICATIONS

United States Office Action, U.S. Appl. No. 15/900,409, filed Apr. 18, 2019, nine pages.

(56) References Cited

OTHER PUBLICATIONS

Vega-Oliveros, D. A. et al., "'This Conversation will be Recorded': Automatically Generating Interactive Documents from Captured Media," DocEng 2010, Sep. 21-24, 2010, pp. 37-40.
United States Office Action, U.S. Appl. No. 15/900,399, dated Dec. 5, 2019, 17 pages.
Maskey, S. et al., "Summarizing Speech without Text Using Hidden Markov Models," Proceedings of the Human Language Technology Conference of the North American Chapter of the ACL, Jun. 2006, pp. 89-92.
United States Office Action, U.S. Appl. No. 15/900,399, filed Aug. 30, 2019, 16 pages.
Non-Final Office Action from U.S. Appl. No. 16/657,185, dated Aug. 19, 2020, 7 pages.
Non-Final Office Action from U.S. Appl. No. 16/587,647, dated Jul. 10, 2020, 20 pages.
Habibi M., et al., "Keyword Extraction and Clustering for Document Recommendation in Conversations", Apr. 2015, vol. 23 (9), pp. 746-759.
Final Office Action from U.S. Appl. No. 16/587,647, dated Dec. 2, 2020, 25 pages.
Non-Final Office Action from U.S. Appl. No. 16/587,424, dated Dec. 2, 2020, 17 pages.
Notice of Allowance from U.S. Appl. No. 16/657,185, dated Oct. 21, 2020, 6 pages.
Bestpractices, "Cloud Speech-to-Text," retrieved from https://cloud.google.com/speech-to-Text/docs/best-practices, on Oct. 17, 2019, 3 Pages.
Blood S., et al., "Contextualizing Virtual Assistants for More Effective Meetings in the Digital Workplace," Mar. 22, 2017, Gartner Research Note, retrieved from https://www.dropbox.com/s/k8m69qbsbry8niu/GARTContextualizing%20Virtual%20Assistants%20for%20More%20Effective%20Meetings%20in%20th%20Digitai%20Workplace_March%202017.pdf?dl=O, 12 Pages.
Dropbox Paper "Scriba: Y Combinator Funding Application," retrieved from https://paper.dropbox.com/doc/Scriba-Y-Combinator-Funding-Application—AlwgyvHSgUI_HAgZOfFQ1SR8Ny2fjiQXp63o, on Sep. 30, 2019, 5 Pages.
Geitgey A., "Machine Learning is Fun Part 6: How to do Speech Recognition with Deep Learning," Dec. 23, 2016, retrieved from https://medium.com/@ageitgey/machine-learning-isfun-part6-how-to-do-speech-recognition-with-deep-learning-28293c162f7a, on Oct. 17, 2019, 15 Pages.
Hoffman R., "Using Artficial Intelligence to Set Information Free," Jun. 14, 2016, retrieved from https://sloanreview.mit.edu/article/using-artificial-intelligence-to-humanize-management-and-set-information-free/, on Sep. 30, 2019, 3 Pages.
Jon Fingas, "Google AI can pick out voices in a crowd," Apr. 12, 2018, retrieved from https://www.engadget.com/2018/04/12/google-ai-looking-to-listen-voice-separation/?guccounter=1, on Oct. 17, 2019, 3 Pages.
Kurt Varner, "Paper Strategy Update," Aug. 29, 2017, Quarterly Strategy Review, 56 Pages.
McKinley D, "Design for Continuous Experimentation," https://mcfunley.com//continuous-experimentation/, on Sep. 30, 2019, 21 Pages.
Sharma G., "Voice Is the New Platform and the Future of Search, Commerce, and Payments," Jul. 16, 2016, retrieved from https://medium.com/@gaurav.sharma/voice-is-thenew-o-s-and-the-future-of-search-commerce-and-payments-64fc8cc848f6, on Sep. 30, 2019, 15 Pages.
"What Meetings Are Really Costing You," Oct. 17, 2019, retrieved from https://www.readytalk.com/sites/default/files/infographic-what-meetings-are-really-costingyou.pdf, on Oct. 17, 2019, 1 Page.
Notice of Allowance from U.S. Appl. No. 15/900,399, dated Apr. 7, 2020, 2 pages.
Notice of Allowance from U.S. Appl. No. 15/900,399, dated Feb. 28, 2020, 19 pages.
Notice of Allowance from U.S. Appl. No. 16/657,185, dated Jan. 25, 2021, 5 pages.
Non-Final Office Action from U.S. Appl. No. 16/587,647, dated Sep. 3, 2021, 19 pages.
Non-Final Office Action from U.S. Appl. No. 16/587,647, dated Sep. 2, 2021, 35 pages.
Non-Final Office Action from U.S. Appl. No. 17/114,739, dated Sep. 28, 2021, 12 pages.
Final Office Action from U.S. Appl. No. 16/587,424, dated Apr. 9, 2021, 22 pages.
Non-Final Office Action from U.S. Appl. No. 16/587,408, dated May 21, 2021, 20 pages.
Notice of Allowance from U.S. Appl. No. 17/114,739, dated Jan. 20, 2022, 6 pages.
Final Office Action from U.S. Appl. No. 16/587,408, dated Dec. 17, 2021, 24 pages.
Final Office Action from U.S. Appl. No. 16/587,424, dated Jan. 14, 2022, 28 pages.
Notice of Allowance from U.S. Appl. No. 17/114,739, dated Feb. 3, 2022, 2 pages.
Final Office Action from U.S. Appl. No. 16/587,647, dated Feb. 24, 2022, 44 pages.

* cited by examiner

Draft Speech

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

Share

New Comment...

Comments (6)

Edward Everett    12/15/10 at 11:05 pm
You say in two minutes what would take me two hours. Well done.

Bill Seward    12/15/10 at 11:10 pm
Certainly the bloodiest...
_____ 2 more comments _____

John Hay    12/15/10 at 11:1pm
What happened to "It is altogether fitting and proper that we should do this." ???

Reply

George Bancroft    12/15/10 at 11:05 pm
I would like to use this in fundraising for soliders.
@Bill_Seward your thoughts?

Reply

*FIG. 5A*

Draft Speech — 531

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

Share

Comments (7)

New Comment...

John Nicolay   12/16/10 at 8:25 am
I like this version better than the first draft
@file
Reply Edward Everett   12/15/10 at 11:05 pm
You say in two minutes what would take me two hours. Well done.

Bill Seward   12/15/10 at 11:10 pm
Certainly the bloodiest...
2 more comments

John Hay   12/15/10 at 11:1pm
What happened to "It is altogether fitting and proper that we should do this." ???
Reply George Bancroft   12/15/10 at 11:05 pm
I would like to use this in fundraising for soliders.
@Bill_Seward your thoughts?
Reply

Recent docs  Created by me  Shared with m[e]

Draft Speech
Shared with Edward Everrett and Bill Seward · You viewed 5 days ago

Draft Opinion: Gibbons v. Ogden
Shared with John Marshall · You viewed 7 days ago · Edited 7 days ago

A Brief History of Steel Production in Ohio
Shared with Robert Jackson · You viewed 10 days ago · Edited 11 days [ago]

Proposed Footnote for Carolene Products Opinion
Shared with Harlan F. Stone · You viewed 13 days ago · Edited 13 days [ago]

The Effects of Education on Interstate Commerce
Shared with William Rehnquist · You viewed 14 days ago · Edited 17 da[ys]

604

Draft Opinion: Gibbons v. Ogden

| John Marshall commented | 1 day ago |
| How do you like this ending? | |
| John Marshall commented | 2 days ago |
| The enumeration . . . | |
| John Marshall commented | 2 days ago |
| Please edit this part | |

A Brief History of Steel Production in Ohio

| Robert Jackson commented | 4 days ago |
| I see a zone of twilight. | |
| Robert Jackson commented | 5 days ago |
| What does Hugo think about this? | |

Draft Speech

| George Bancroft commented | 5 days ago |
| @Bill Seward your thoughts? | |

File Level Comments

John Nicolay   12/15/10 at 11:05 pm
I like this version better than the first draft George Bancroft   12/15/10 at 11:09 pm
Did anyone check the math re 4 score + 7? @file Reply

*FIG. 6A*

MEETING TRANSCRIPTION USING CUSTOM LEXICONS BASED ON DOCUMENT HISTORY

TECHNICAL FIELD

The disclosed embodiments generally relate to the capture and transcription of audio data, and more specifically to the accessibility and use of audio data as a tool for effective meetings.

BACKGROUND

Online collaborative sharing of documents is typically provided by a network-based file sharing computer system that allows multiple users to access and edit the files. Generally, documents are created and edited by a specific type of native application, such as a word processor or spreadsheet application. Many such applications provide support for co-editing a single document among many users. Collaborative documents may be used for a variety of purposes, including for collaboration between multiple users in professional settings. There is a need for collaborative systems to capture and manipulate audio data within or in conjunction with collaborative documents to make professional collaborations, such as meetings, more efficient for users.

SUMMARY

In some embodiments, a collaborative content management system accesses audio data associated with a collaborative document. The audio data is transcribed into text, producing a text transcription. When the system receives a search query from a user accessing the collaborative document, the system identifies portions of the text transcription corresponding to the query and receives a selection of one or more results (each corresponding to an identified portion of the text transcription) from the user. Based on the selection of the search results, the system identifies portions of the audio data corresponding to the portion of the text transcription associated with the selected result and causes playback of the audio data portions. For instance, a playback interface element can be displayed adjacent to a search result that, when selected, causes the playback of audio data corresponding to the portion of the text transcription that corresponds to the search result.

In some embodiments, the collaborative content management system accesses audio data associated with a collaborative document. The audio data is transcribed into text, producing a text transcription. Based on the text transcription, the collaborative content management system generates a text outline. The system then modifies the collaborative document associated with the audio data to incorporate the generated text outline, which can then be accessed and modified by users with access to the document.

In some embodiments, the collaborative content management system identifies hot words within the audio data associated with the collaborative document, wherein each hot word is associated with an action taken by the system to modify the document. As used herein, a "hot word" refers to a portion of text that denotes an action to be taken with regards to a document. For example, hot words may be associated with actions to generate a summary, to modify objects within the document, or to modify the permissions associated with the document. The collaborative content management system modifies the collaborative document and displays the modified document. The modified document may then be accessed, viewed, and modified by users with access permissions to the document.

In some embodiments, the collaborative content management system accesses a custom lexicon based on documents associated with one or more speakers in the audio data for use in generating the text transcription of the audio data. For example, a custom lexicon may be generated for a user based on vocabulary included within text documents, spreadsheets, slideshows, and other documents associated with the user on the collaborative content management system. Using the custom lexicon, the collaborative content management system transcribes the audio data into text, and can modify the collaborative document associated with the audio data to include the text transcript.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5A shows an example user interface of a collaborative content item page including various comments.

FIG. 5B shows an example user interface with a file-level comment associated with the title of the collaborative content item.

FIG. 6A shows an example user interface with a plurality of collaborative content items, a list of notifications, and file level comments.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
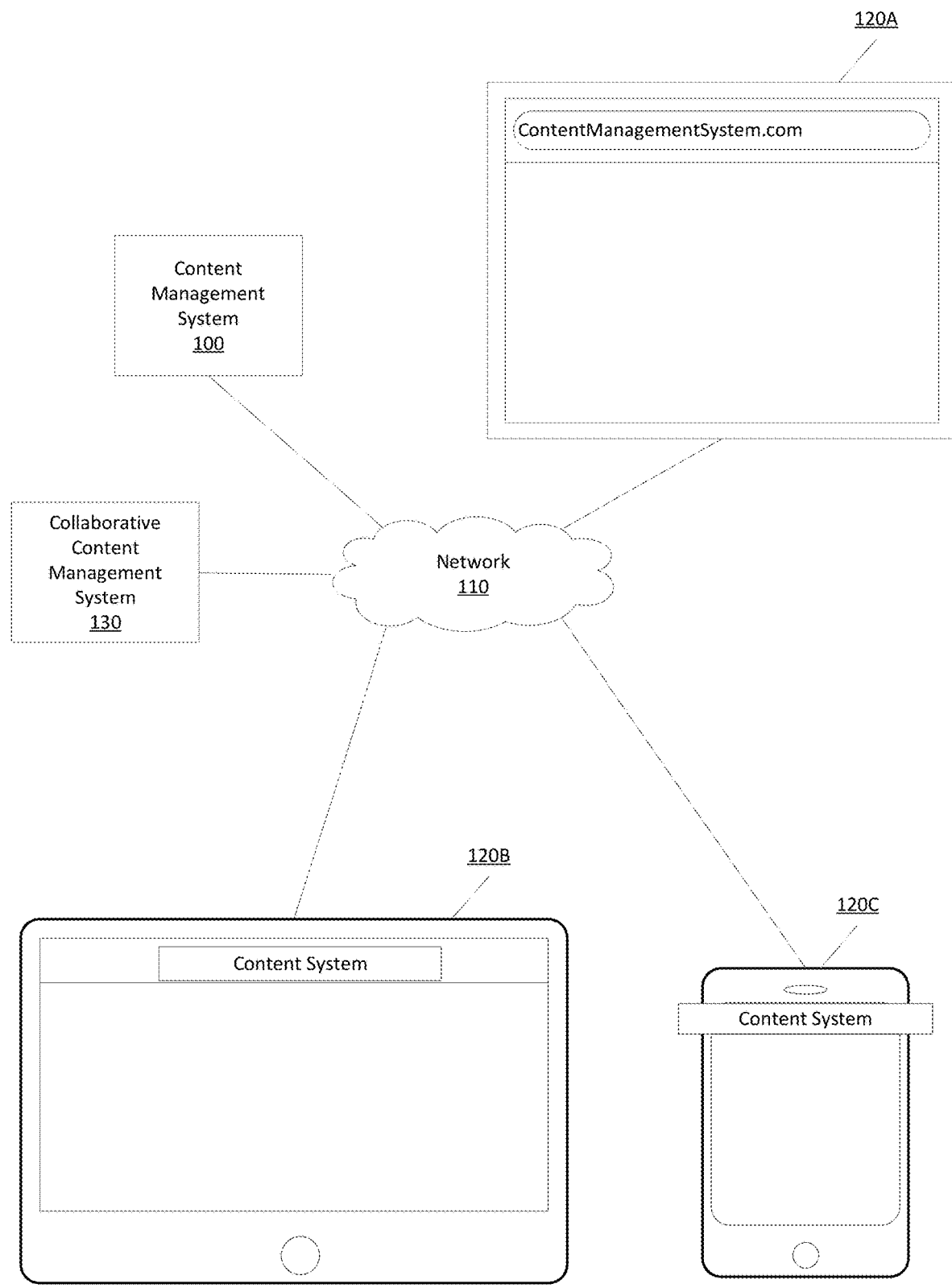
FIG. 1 shows a diagram of a system environment of a content management system and a collaborative content management system according to example embodiments.

FIG. 1 shows a system environment including content management system 100, collaborative content management system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In some embodiments, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In some embodiments, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Client Device

Figure 2:
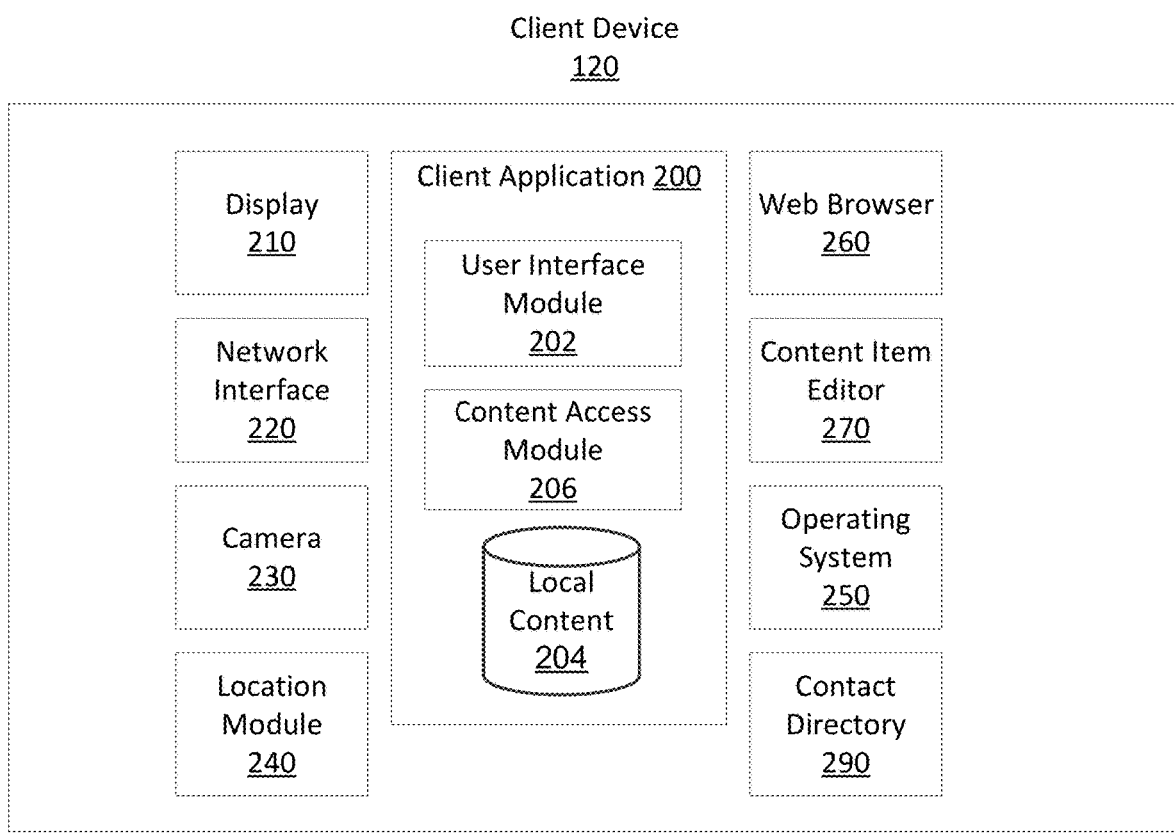
FIG. 2 shows a block diagram of components of a client device, according to example embodiments.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
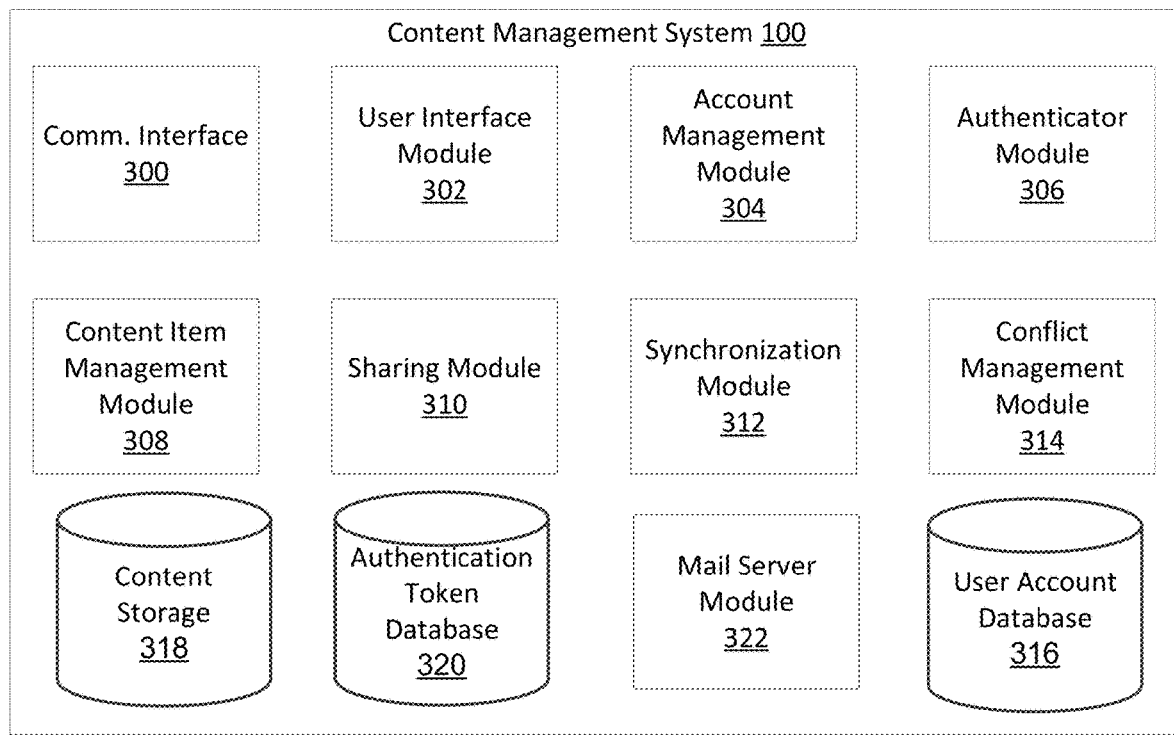
FIG. 3 shows a block diagram of a content management system, according to example embodiments.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

In some embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Collaborative Content Management System

Figure 4:
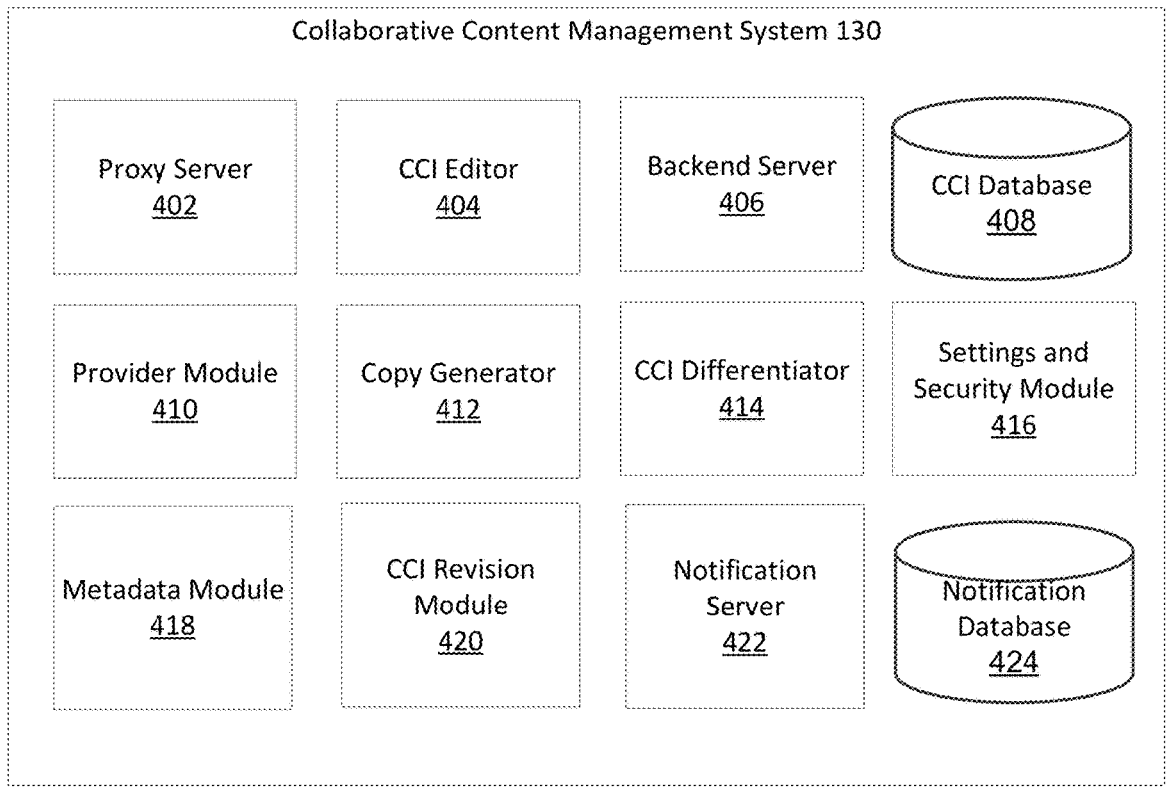
FIG. 4 shows a block diagram of a collaborative content management system, according to example embodiments.

FIG. 4 shows a block diagram of the collaborative content management system 130, according to one embodiment. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content management system 130 is shown as separate from content management system 100 and can communicate with it to obtain its services. In other embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In an alternative embodiment, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In some embodiments, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In some embodiments, the access module can also provide the access link to user accounts via the network 110, while in other embodiments the access link can be provided or made accessible to a user account and is accessed through a user account via the client device. In some embodiments, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In some embodiments, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differential collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Comment Management User Interface

Referring now to FIG. 5A, there is shown an example user interface with a page of a collaborative content item 502 entitled "Draft Speech" in which several comments 504 associated with the collaborative content item have been made. In this example, a collaborative content item 502 is composed of content such as lines of text, which can be arranged such as in paragraph blocks 508, and may include any other form of media, such as images, videos, spreadsheets, executable or interpretable code, and so forth.

Content Level Comments

A collaborative content item 502 can have zero or more content level comments 504. Content level comments can be associated with specific portions of a collaborative content item. The presence of content level comments 504 within the content item may be indicated by underlined (or colored underlined) portions 510 of content, though any other formatting may be used to indicate the presence of a content level comment 504 (e.g., lines connecting the content level comments to the content item, comment numbers in superscript form, highlighting, a "hover over" display indicator etc.). The portion 510 of content with which a content level comment is associated is also called a span. Content level comments 504 can be associated with overlapping spans; the first and second content level comments 504a, 504b are applied to the span "Now we are engaged in a great civil war, testing whether that nation, or any nation so conceived, and so dedicated, can long endure" and the third comment 504c is associated with just the span "This we may, in all propriety do."

The content level comments 504 can be arranged in a comment pane 512 positioned to the side of the body of the collaborative content item 502. Each content level comment 504 has an author 514 (indicated by user name) and a creation date and time. A collection of comments that together form an exchange between users with respect to a single span is a thread 518. Threads are displayed proximate the span that is associated with the thread. In the example of FIG. 5A, there are three threads, 518a, 518b, and 518c; thread 518a has a total of four comments (two shown, and "2 more comments" as indicated) and the other threads have one comment each.

A user may create a new comment or reply to existing comment. To create a comment, a user selects a span in the content item, and activates a comment function, for example via button 522, menu or other input. The new comment 504 is displayed in the comment pane 512, indicating the user name and creation time, and the user may then enter text for the comment therein. The user can apply text formatting to the text of the comment as done for formatting the text of the collaborative content item. A user may also create a comment to include in a thread by entering text into a reply field 516 in one of the comments 504, such as the most recent comment in a thread 518.

When a user opens a collaborative content item initially, the comment pane 512 can be closed such that the comments therein are hidden. The user can activate the comment pane 512 to show the content level comments by selecting text (e.g., double clicking) text that is formatted or otherwise indicated as having an associated comment. In some implementations, the comment pane 512 can be visible when a collaborative content item is opened. The pane 512 includes a counter 524 of the current number of content level comments in the collaborative content item that are visible to the user. Each comment can have a state, as to whether the comment is active or resolved. The counter 524 serves as a menu that the user can select from to filter the comments so as to show all comments, active comments or resolved comments.

A collaborative content item may also include a share icon 526 that allows a user to share the collaborative content item with other users of the content management system 100. Upon clicking on the share icon 526 a sharing interface is displayed to the user. The sharing interface can include a field for adding user names or email addresses to the list of users with which the collaborative content item is to be shared. The sharing interface may also include a text field to allow the sharing user to send a message to users receiving the request to share the collaborative content item.

User Primitives

In some embodiments, the collaborative content management system 130 is configured to recognize particular text patterns as functional primitives that activate various functions of the collaborative content management system 130. One type of functional primitive is a user primitive. A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user.

In some embodiments, the user primitive takes the form of @username where the "@" symbols is a predetermined token indicates to the collaborative content management system 130 that the following string username is the user name of a system user. Referring to FIG. 5A, several examples of user primitives 520 are illustrated. First in the text of the collaborative content item, the first sentence includes the user primitives "@Bill_Seward" and "@John_Hay. The user primitive "@Bill_Seward" is also shown in the text of comment 504d. The collaborative content management system 130 recognizes these primitives as it processes the text of the collaborative content item and comments.

When a user primitive indicating a specific user appears in the span for a thread, or the text of a comment, the collaborative content management system 130 includes the userID for the indicated user in the audience for thread containing the comment. This allows the mentioned user to see the entire thread in which they are mentioned when accessing the collaborative content item (since access to the thread when opening a collaborative content item is determined by presence of a user's ID in the audience), as well for a mechanism to notify the user, as next described.

In some embodiments, when a user primitive occurs elsewhere in the collaborative content item, but outside of the span for the thread, the userID for the mentioned user is included in the audience. For example, if a user is mentioned in the same paragraph as the span for a thread, the userID for the user is included in the audience.

Contextual Primitives

In addition to user primitives, the collaborative content management system 130 may also support contextual primitives. Contextual primitives function in a similar way to user primitives, however, instead of adding a single user to the audience of a thread, contextual primitives can add a group of users, or user(s) assigned to a specific role (e.g., owner, editor, etc.), to the audience of a thread using document context. A contextual primitive is indicated by a predetermined token followed by a predetermined text string. Each predefined text string may incur different functionality from the collaborative content management system 130. A user inserts the contextual primitive as they are editing the content item.

In some implementations, including the @doc primitive can cause every user with access to the collaborative content item to be included in the audience of a thread that includes the primitive. An algorithm to achieve this functionality is as follows. The collaborative content management system 130 detects the "@doc" text string in the span of a thread or in a comment content and accesses the collaborative content item index of the collaborative content item database 408. The collaborative content management system 130 determines the userIDs with viewing privileges for the collaborative content item according to the collaborative content item index and adds those userIDs to the audience_list for the thread. Alternatively, as discussed below, the system can include an entry in the collaborative content item audience list indicating that multiple users such as all users, authenticated users, users that are part of a particular group, etc., should be included as audience members. When the collaborative content item is subsequently accessed, the thread including the "@doc" primitive will be visible to all users viewing the collaborative content item. Additionally, any notification generating activity in the thread will be reported to all users in the collaborative content item.

In some embodiments, the "@doc" primitive is dynamic such that any users that are added to the collaborative content item even after the thread has been created will be able to view the comment thread. This may be accomplished by reevaluating the span of a thread and the comment text of a thread each time the collaborative content item is compiled. Alternatively, instead of adding userIDs to the audience_list of a thread directly, the collaborative content management system 130 may create a special ID value indicating that the "@doc" primitive has been used. Therefore, during compilation of the collaborative content item, the collaborative content management system 130 checks to see if a particular thread should be displayed to a viewing user by referencing the audience_list of the thread. If the collaborative content management system 130 detects the special ID associated with the "@doc" primitive it will reference the collaborative content item database 408 to determine which users have viewing permissions. If the user ID of the current user is included in the collaborative content item database 408 then the collaborative content management system 130 displays the thread to the current user.

In addition the collaborative content item audience primitive, other contextual primitives may be implemented:

The "@folder" primitive informs the collaborative content management system 130 that all users with access to the folder that includes the collaborative content item should be able to view the thread. In this case, some of the users that have access to the folder may not have access to the collaborative content item. In this case, the collaborative content management system 130 may grant all users with access to the folder access to the collaborative content item, provide a separate interface for users without access to the collaborative content item to view the thread, or it may provide the users without access to the collaborative content item with notifications regarding the thread over email.

The "@editing" primitive indicates that all users with editing access to the collaborative content item are to be included in the audience for a thread. The collaborative content management system 130 parses this in the same way as the "@doc" primitive. However, instead of retrieving all users associated with the collaborative content item in the collaborative content item index only users with editing access are added to the audience_list for the thread. The "@sharing" primitive (only users with sharing privileges are added to the audience_list) functionality is implemented in a similar manner.

The "@threads" primitive adds all users that have participated in threads in the collaborative content item already to the audience_list of the current thread. To accomplish this, upon detecting the "@threads" primitive the collaborative content management system 130 accesses each thread object associated with the collaborativeContentItemID and adds any users listed in the audience_list of those threads the audience list of the current thread.

Depending on the embodiment, the specific text string associated with the primitive may be different. A user may also define their own contextual primitive using the client application to select users, categories of users, and contextual categories of users to be included in the primitive. Additionally, and contextual primitive may be made dynamic using a special ID in the audience_list which triggers a reevaluation of the audience list during compilation of the collaborative content item.

File-level Comment Interfaces

The collaborative content management system 130 also enables file-level commenting and may utilize a number of user interfaces depending on the embodiment. A file-level comment is associated with the file itself and persists with the file until the file is deleted or the comment itself is deleted. This allows for conversations between users to occur on a file-level that persists with each iteration on the file. The methods described herein, also allow for the simultaneous display of the collaborative content item and file-level comments so a user can review the collaborative content item and make comments on the collaborative content item without having to change windows. File-level comments have many of the same characteristics as the content level comments and rely on the same underlying data structure. However, file-level comments are not associated with a span of the collaborative content item and are instead associated with the entirely of the content item. Despite these differences, file-level comments may be used to form threads and have an associated author, creation time and date, which may be displayed in a similar fashion as in content level comments depending on the embodiment.

Because file-level comments are not associated with a particular span of the collaborative content item, different UI elements may be used to display the file-level comments. FIG. 5B illustrates an embodiment for creating and displaying file-level comments.

FIG. 5B shows an example user interface with a file-level comment associated with the title of the collaborative content item. FIG. 5B displays the same six comments and four threads as in FIG. 5A, with the addition of a file-level comment 528. The file-level comment is displayed alongside the content level comments in the comment pane 512. Instead of being for a particular span in the collaborative content item, as with the content level comments, the file-level comment 528 is associated with the entire document, and is indicated in the collaborative content item by visually distinguishing features 531, such as formatting or highlighting, borders or the like to the title of the collaborative content item 530. Optionally, the same visually distinguishing features can be applied to the comment itself, so that the user knows that which comments are associated with the file and which with specific spans of the content item. FIG. 5B also illustrates the use of a file-level primitive 532, "@file", to indicate that a comment is file-level comment rather than a content level comment.

User Interface for Displaying a List of Notifications

FIG. 6 shows an example user interface with a list of collaborative content items 602 and a list of notifications 604. This user interface allows a viewing user to view the collaborative content items to which the viewing user has been granted access (hereinafter "the user's collaborative content items"). As referred to herein, the "viewing user" is the user viewing the user interfaces described herein. In this example, the collaborative content management system 130 has granted the viewing user access to multiple collaborative content items, including the five collaborative content items 606A through 606F shown in the "recent docs" tab 608 of the user interface. The user interface also includes "created by me" and "shared with me" tabs 610, 612 that the viewing user can select to access additional lists of collaborative content items.

When other users make certain types of changes to the viewing user's collaborative content items, the collaborative content management system 130 generates a notification of the change. The collaborative content management system 130 defines one or more triggering actions. A triggering action is a change made by another user that causes the collaborative content management system 130 to create a notification about the change and provide the notification to the client device of the viewing user. For example, a triggering action may occur when another user adds or alters a portion of the collaborative content item, or adds a comment to a thread, for example in a thread that already includes a comment added by the viewing user.

The client application 200 receives notifications from the collaborative content management system 130 and can display a notification in a variety of ways. One way of displaying a notification is the notification list 604 shown in FIG. 6. The notification list 604 includes notifications for several of the viewing user's collaborative content items, and it is displayed when the viewing user selects the notification icon 614. In the example shown in FIG. 6, the notifications in the notification list 604 are sorted by the age of collaborative content item, and the notifications for each collaborative content item are sorted from most recent to least recent.

The client application 200 displays each notification in the notification list 604 with notification text and a short phrase indicating whether the notification relates to a comment or a portion of text in the collaborative content item content. Although not explicitly shown in FIG. 6, each notification can also include a content span and a notification link. The content span associates the notification with a span of content in a collaborative content item 502. The notification link is a link to the collaborative content item and includes a pointer to the content span. A user input selecting a notification in the notification list 604 selects the link. The selection of the link causes the client application 200 to open the collaborative content item to a position where the content span is visible. As a beneficial result and improvement in functionality, the user does not have to scroll through the collaborative content item to find the change that was the subject of the notification.

Referring to the final notification 616 in the notification list 604 as an example, the notification text is the user primitive "@Bill Seward" and the adjacent text "your thoughts." A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user. In some embodiments, the user primitive takes the form of @username where the "@" symbol is a predetermined token that indicates to the collaborative content management system 130 that the following string "username" is the user name of a system user. In some implementations, other predetermined tokens can be used to indicate a primitive. If the user selects this notification 616, the notification link causes the client application 200 to open the collaborative content item 502 shown in FIG. 5A to a position where the span 510b is visible.

If the notification is generated in response to a file-level comment, the file-level comment may have no associated span in the associated collaborative content item or may set the span to be the collaborative content item title. The link included in the notification may open the collaborative content item displaying the beginning of the content or the title. [0090] In addition to displaying notifications for file-level comments in notification list 604, the client application 200 may also display a file-level thread pane 618, which displays file-level comment threads corresponding to a selected collaborative content item 620. In some implementations, file-level thread pane 618 can display file-level comment threads corresponding to multiple selected collaborative content items. In some implementations, file level thread pane 618 can display file-level comment threads corresponding to multiple of collaborative content items 606, whether or not the collaborative content items are selected. In the illustrated example, file-level comments from the collaborative content item titled "Draft Speech" are displayed in the file-level thread pane 618. In some embodiments, users may utilize the file-level thread pane 618 to add or reply to file-level comments without opening the associated collaborative content item. [0091] In various implementations, any of collaborative content items, the associated comments, or collaborative content item file structure and other metadata can be locally stored on a client device. For example, content can be downloaded from the collaborative content management system 130 for use in an offline mode. The inclusion of a file-level thread pane 618 may be especially beneficial for this offline use where file-level comments may be downloaded for offline viewing in the file-level thread pane 618. This would allow users to receive some information about collaborative content items without having to store the enter contents of the collaborative content items locally. For example, users may view file-level comments for collaborative content items listed in file-level thread pane 618, without requiring the collaborative content items to also be locally stored.

Database Structures

Figure 6B:
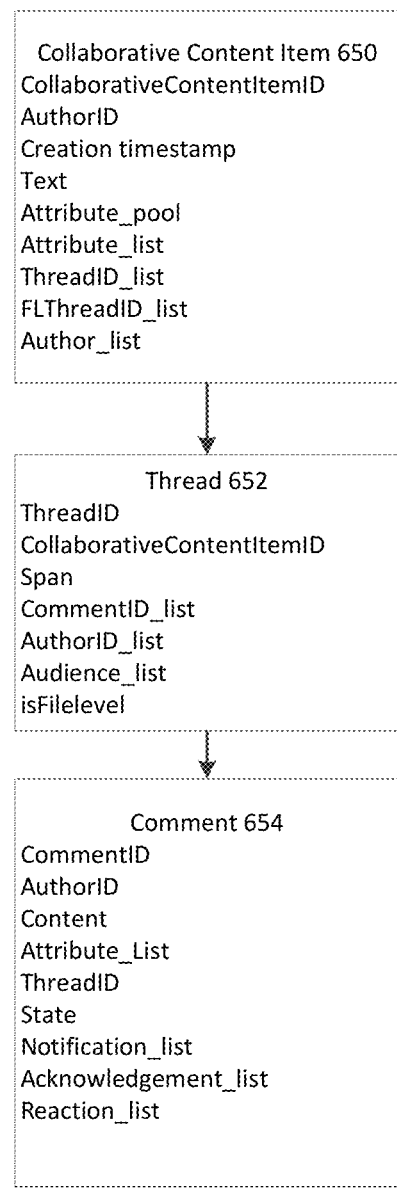
FIG. 6B shows an example of the data structures for collaborative content items, comments, and comment threads.

Referring to FIG. 6B, collaborative content item database 408 (CCI database) stores the collaborative content items, content level and file-level comments, and threads as database entities, and provides programmatic access thereto for searching and retrieving these entities and is one means for performing these functions. The CCI database 408 can be implemented in a relational form using separate tables for collaborative content items, threads, and comments, or using objects, BLOBs, files, or other structures. Additionally, the CCI database 408 may provide a folder hierarchy storage system separate from the content management system 100. In this case, folders would be saved as an additional data structure in the CCI database 408.

Each collaborative content item data element 650 is composed of a number of elements. In some embodiments, the elements are as follows:

CollaborativeContentItemID: a unique identifier assigned by the collaborative content management system 130 to access the collaborative content item.

AuthorID: the userID of the user who created the collaborative content item, and may include the username of the user. These values may be encrypted for privacy.

Creation timestamp: indicates the date and time that the collaborative content item was created.

Text: The text of the collaborative content item is represented as string of ASCII characters.

Attribute pool: Formatting attributes (e.g., bold, underline, italics, font, font size, line spacing, paragraphs, and the like) that are used in the collaborative content item. The attribute pool is a set of attributeIDs used in the collaborative content item; a native set of attributeIDs and associated formats are provided by the collaborative content management system 130. The following table is an example of a portion of an attribute pool:

| Attribute ID | Formatting |
|---|---|
| 0 | None |
| 1 | Bold |
| 2 | Italic |
| 3 | Underline |
| 4 | Strikethrough |
| 5 | Superscript |
| 6 | Subscript |
| 7 | Single Space |
| 8 | Doublespace |
| ... | ... |

Attribute_list: Formatting attributes are applied to portions of a content item, such as text, by the attribute list. The attribute list element is a list of (span=attributeID) pairs, where the attributeID indicates the attribute(s) from the attribute pool and the span specifies the number of characters to which the attribute(s) is to be applied when the text is rendered, starting from the end of the previous span, so that the entire length of the collaborative content item is coded for attributes. For example, the text "Text with bold, italic, and bold italic formatting." would be attribute coded as {10-0, 4-1, 2-0, 6-2, 6-0, 11=1 2, 12=0}.

ThreadID_list: a list of all threads that are associated with a collaborative content item. ThreadIDs in the ThreadID_list may represent threads of content level comments or threads of file-level comments.

FLThreadID_list: a list of all file-level threads 528 that are associated with a collaborative content item. Thus, the FLThread_list contains a subset of the threads in Thread ID list.

Author_list: a sequential list of the users who have contributed to the collaborative content item text, according to the sequence of contributed or edited text portions, using the same coding pattern as attribute list, i.e., (span=userID) pairs. For example, the author_list {100=199, 50=54, 200=199} indicates that in a text of 350 characters, there is a sequence of three text portions, the user with userID 199 authored the first portion with 100 characters, followed by userID 54 who authored the second portion with 50 characters, followed again by userID 199 who authored the third portion with the remaining 200 characters.

The span coding of the attributes and authors is beneficial because it allows for efficient management of insertions and deletions of content. For example, when text is inserted or deleted, only a limited number of spans following the insertion or deletion need to be modified (those with spans falling within or overlapping the span of the inserted or deleted text), and spans that are not impacted do not need to be updated, since their relative positions are unchanged. In other embodiments, the author list may be organized in a different fashion; for example, with the userID of each author followed by a list of text portions edited by that user.

Each thread data element 652 is composed of a number of elements. In some embodiments thread data element 652 includes the following elements:

ThreadID: unique identifier assigned by the collaborative content management system.

CollaborativeContentItemID: the CollaborativeContentItemID of the file that contains the thread.

Span: a delineated portion of the content of the identified collaborative content item to which the thread applies. The delineated portion is defined based on the type of the content. For example, a span in text can be defined by the position of the first character in the span, and the length of the span (in number of characters); a span in an image can be defined by a bounding region, for example a set of (X,Y) coordinates, relative to the image origin that define a polygon within the region; a span in a spreadsheet can be defined by a range of cells by column and row numbers. For example, the span (50, 25) indicates a text portion starting at character position 50 within the collaborative content item and running 25 characters in length. As the content in the collaborative content item is edited, the collaborative content management system 130 updates the span element of each thread. For example, if a five-character portion of the text before the span (50, 25) is deleted, then the content management system will modify the span of the thread to (45, 25). It is also possible for users to delete text included in the span. If all of the text included in the span of a thread is deleted, then the span will have a null value and is removed by the collaborative content management system 130 (unless isFilelevel is True as described below).

In some implementations, only content level comments are associated with a span, in this case a thread of file-level comments may have a null value for a span accompanied by a True value for the is Filelevel element. This is one mechanism for a thread of comments to persist in the CCI database 408 until the thread of comments is deleted, no matter what other content in the collaborative content item is removed or edited. For example, the title of a collaborative content item can be modified (e.g., edited or deleted). This change may not affect the file-level comment, even though file-level comment can be displayed as being associated with the collaborative content item title. For example, if a collaborative content item title is deleted, a file-level comment can remain attached to a field or other designated title location within the collaborative content item. As another example, a user can edit a collaborative content item title. A file-level comment can remain attached to a designated title location within the collaborative content item that contains the edited collaborative content item title.

CommentID_list: a list element of commentIDs of the comment data elements (e.g., comment data elements 654) included in the thread corresponding to thread data element 652.

AuthorID_list: a list of userIDs of the authors of comments in the thread.

Audience_list. The Audience_list element is a list indicating the users to whom the thread and its comments are displayed when accessing the collaborative content item, and to whom notifications of changes in the thread are sent.

The audience for a thread can be determined differently for file-level comments than for content level comments. In various implementations, the audience of a content level thread may comprise one or more of the userIDs of the i) the author of the collaborative content item containing the thread; ii) the authors of comments included in the thread; iii) the authors of any text included in the span for the thread; iv) any user mentioned in the span the thread via a user primitive (further described below); v) any user mentioned in a comment via user primitive; or vi) any user who has opened the collaborative content item; vii) any user who has edited the collaborative content item; or viii) any user who has created an association with the collaborative content item, such as by marking it as a favorite or followed collaborative content item. In some implementations, an audience for the thread may not be defined specifically for the thread, but instead may be identified dynamically as needed based on, e.g., user identifiers associated with the comments or with the collaborative content item. The inclusion of an audience for each thread allows for control of which users are notified of, and have access to specific comments as further described below.

isFilelevel: a value indicating whether the thread is a file-level thread (associated with the collaborative content item as a whole as opposed to a particular span) or whether the thread is a content level thread (associated with a particular span in the collaborative content item). Before deleting a content level thread for having a null span, the collaborative content management system 130 checks the isFilelevel value for the thread to determine whether it should be deleted. If isFilelevel is True, the thread will not be deleted. The isFilelevel element is also used to determine how a thread is displayed. If isFilelevel is True the thread is displayed in the collaborative content item as a file-level thread with no associated span. If isFilelevel is False then the thread is displayed as a content level thread and the associated span is highlighted in the collaborative content item.

Each comment data element 654 is composed of a number of elements. In some embodiments, comment data element 654 includes the following elements:

CommentID: a unique identifier assigned by the collaborative content management system 130.

AuthorID: the userID of the author of the comment.

Content: an element storing the content of the comment, which may include text, pictures, or other media.

Attribute_list: a list storing the formatting attributes for the text of the comment, in the same manner as described above for collaborative content items.

ThreadID: the threadID of the thread to which the comment belongs.

State: an enumerated variable storing a value indicating the state of the comment as either active or resolved.

Notification_list: the Notification_list element is a list of userIDs indicating the users to whom a notification of the comment has been sent, as further explained below. This list is updated each time a notification message including the comment is sent to specific user.

Acknowledgement_list: the Acknowledgement_list element is a list of userIDs indicating the status of each user with respect to the comment. For example, the Acknowledgement_list may indicate whether each user in the Audience_list of the thread has yet viewed the comment, has read the comment, acknowledges an instruction in the comment, or intends to respond later to the comment, or any other set of enumerated actions or status types. In various implementations, this list can be updated whenever the collaborative content editor 404 displays the comment to a user that has not yet seen the new comment or when a user selects a control in relation to a comment indicating the user's acknowledgement of the comment or the user's intention to respond to the comment. In some embodiments, the collaborative content editor 404 may display a visual indication of users that have viewed a particular comment proximate to the comment in the display. Additionally, the collaborative content management system 130 may provide UI elements for indicating status beyond applying a "read receipt" when a user views a comment for a first time.

Reaction_list: reactions are elements that represent reactions of each user in the audience of the thread to the comment. The reaction list comprises a list of reaction values paired with userIDs. In some embodiments, an interface for providing reactions to each comment is provided and a user may select a reaction using a pull down feature or another such UI feature. An enumerated set of reactions is natively provided (e.g., "Approve," "Disapprove", "Happy", "Angry", "Puzzled" with associated numeric codes 1 . . . 5). Upon selection of a reaction from a reaction interface the numeric code corresponding to the selected reaction is added to the reaction list. For example, reaction pair (345, 5) would indicate that the user with userID 345 had an angry reaction to the comment. In some embodiments, the collaborative content editor 404 displays a visual indication of each reaction proximate to the comment in the display.

User information is also stored as database entities. Each user includes the following elements:

DocumentID_List: a list of collaborative content item identifiers accessible by the user of the user identifier.

RoomID_List: a list of room identifiers of comment rooms accessible by the user of the user identifier. A user may have access to multiple comment rooms for a single collaborative content item.

AnonymousUserID_list: a list of anonymous user identifiers associated with the user. An anonymous user identifier for the user may be generated for each of the collaborative content items based on the user identifier of the user and the document identifier of the collaborative content item. In some embodiments, anonymous user identifiers are not stored by the system, but instead are reconstructed based on the stored user identifier and document identifier.

ThreadID_list: a list of threads in which the user has posted a comment, or is otherwise allowed to access.

Avatar: an identifier that references an avatar, such as an image, associated with the user. The avatar is used as a representation of the user. The avatar may be presented when the user provides a comment or updates a collaborative content item to attribute changes to the user.

AnonymousAvatars_list: a list of anonymous avatars associated with anonymous user identifiers of the user. Each anonymous user identifier may be associated with a different anonymous avatar identifier. In some embodiments, anonymous avatars are not stored in association with users, but instead are referenced by the anonymous user identifier.

CCI database 408 may also include a set of indices. These indices are logical in nature and may be implemented in various ways, depending on the underlying database design. A user index contains a list of all users by their userID, and for each userID there is a list of collaborativeContentItemIDs. Each collaborativeContentItemID identifies a collaborative content item to which the user of the userID is associated and has access to. For each collaborativeContentItemID, there is a status indicator that indicates whether the collaborative content item is active or inactive for the user.

A collaborative content item is active for the user sharing the collaborative content item until the user deletes the collaborative content item. In some embodiments, when the user deletes the collaborative content item, the collaborative content item persists in the collaborative content item database 408 remains associated with the user but status indicator is set to inactive, allowing the user to reactivate their sharing status with the collaborative content item in the future. The collaborative content item remains active for and associated with any other shared users. Alternatively, the collaborative content item may be deleted from the item database 408, so that none of the shared users have access to it anymore. The user index is used to identify collaborative content items associated with (shared with) a given user and the status of those collaborative content items with respect to the user. In some embodiments, a userID index also indicates the privileges the user has with respect to each document that the user is associated with. A value stored with each collaborativeContentItemID in the index indicates whether the user has editing privileges, viewing privileges, and/or sharing privileges.

Collaborative content item database 408 can include a collaborative content item index. The collaborative content item index indicates, for each document, a list of userIDs of users having access to the collaborative content item, and an indication of whether the user is active or inactive. This index can be an inverse of the user index and may be stored together with the user index. The collaborative content item index may also indicate the privileges of each user associated with the collaborative content item using an inverse implementation of the above described user index.

Text Transcription

Audio to text transcription is the process by which spoken language is converted to a text transcript representative of the speech. Transcription may be performed manually by a human transcriber, automatically by a transcription software, or using a combination of manual transcription and automated transcription. Text transcripts of captured speech may be desirable or beneficial for a number of reasons. For example, text transcripts are searchable, take less computer memory, and can be used as an alternate method of presenting the corresponding speech (e.g., as closed captioning).

Text transcription software translates recorded audio data to text using an algorithm to recognize words or sounds spoken in the audio data. In some embodiments, the text transcription software records the audio and converts the recorded audio into a useable file including the transcribed text. In other embodiments, the text transcription software receives a previously recorded audio file (for instance, a file recorded external to the transcription software). Words and sounds spoken in the audio data can be identified based on a lexicon maintained by the text transcription program. A lexicon comprises a vocabulary of words or phrases recognized by the text transcription algorithm, wherein each vocabulary word or phrase is mapped within the lexicon to the sounds that represent it. In some embodiments, a lexicon is organized based on the frequency at which words appear in a spoken language. For example, words such as "and" and "the" may be associated with a higher frequency in an English transcription lexicon than less frequently used words such as "ecosystem". The lexicon used to transcribe an audio file into text can be a generic or default lexicon used for all audio files, or can be a customized lexicon generated, for instance, for a particular speaker or set of speakers (as described below in greater detail).

In some embodiments, the text transcription process uses a machine learning algorithm to customize the transcription of an audio file based on characteristics of voices included within the audio file. For instance, the text transcription software can be trained on sounds corresponding to known words, spoken by a variety of male and female voices, with a variety of accents, and a variety of levels of background noise. Machine learning may additionally be used to improve the accuracy of the lexicon associated with the text transcription process, for instance based on an identity of a speaker within an audio file. For example, a lexicon associated with a chef who frequently discusses ingredients may associate a higher frequency with words such as "thyme" and "flour" than a standardized lexicon. In addition, identified speakers may be associated with groups. A lexicon can be selected and applied to a user's speech based on the groups with which the user or one or more speakers are associated. For example, an identified user may be associated with a legal department group, and a lexicon associated with the legal department group can be applied to speech associated with the user.

Text transcription software may additionally be trained to recognize multiple speakers. In a scenario where speech of multiple speakers is captured within an audio file, differences in voice pitch, accent, and other speaking inflections can be used to identify particular speakers. The generated text transcript is then formatted based on the identified speakers, for instance by using identifiers such as speaker names, speaker numbers, color coding, or other methods of representation in associated with each portion of the text transcript.

Audio Capture, Search, and Playback

When meeting with one or more people, it is often difficult for meeting attendants to manually record notes effectively. Recording audio data during the meeting allows attendants of the meeting to focus on and participate in the immediate context of the meeting, and additionally allows others to later review the meeting without relying on potentially incomplete or inconsistent notes. However, a downside of audio data is the inability to query audio data using particular words or phrases, thus hindering the accessibility of audio data to those searching for portions of meeting audio using search terms. Providing an interface that associates a text transcription of audio to the audio data allows users to quickly search and access portions of an audio file, thus improving user efficiency both during and after a meeting.

Figure 7:
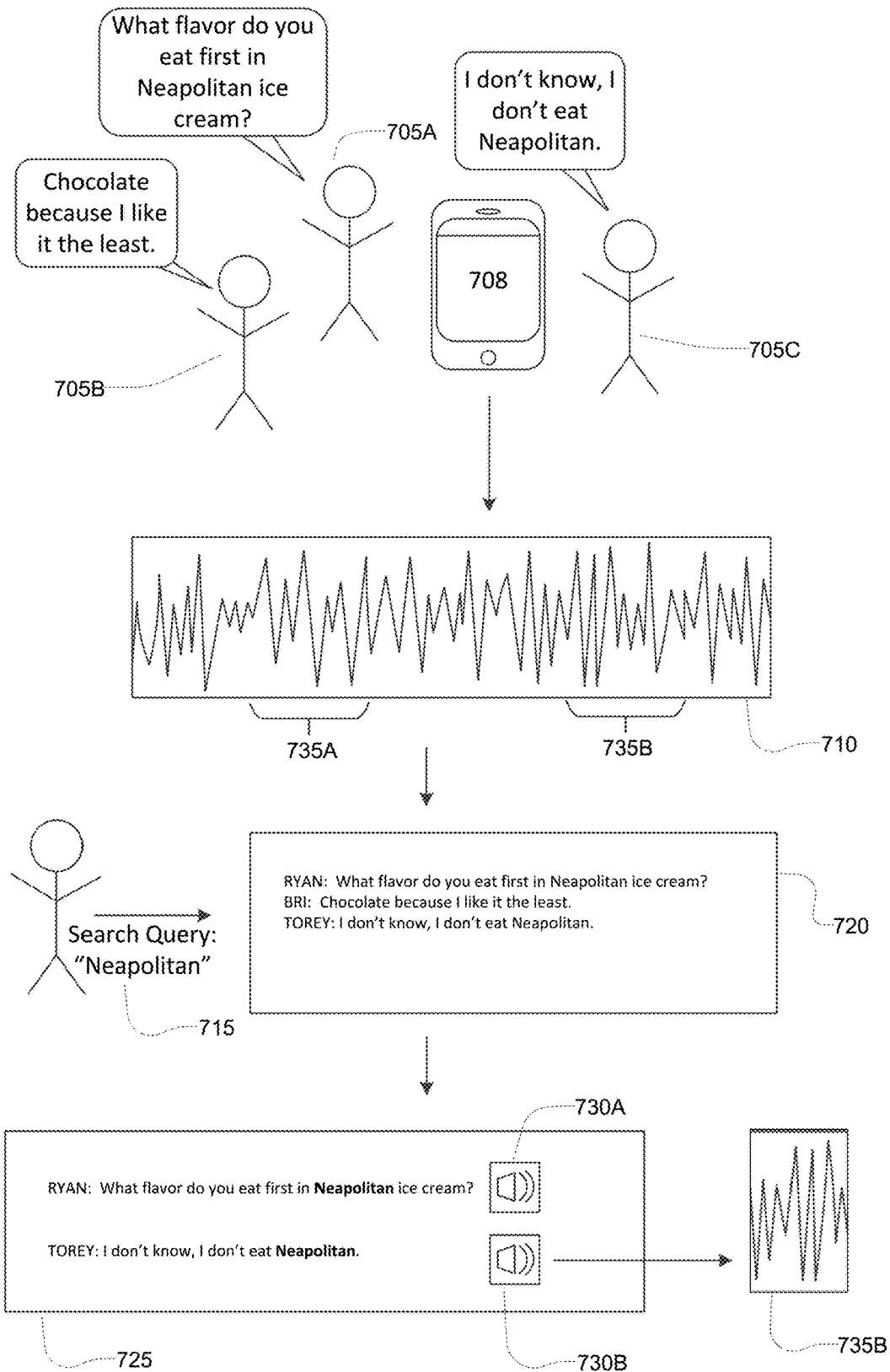
FIG. 7 shows an example illustrating a process for performing a keyword search of audio data.

FIG. 7 is an example illustrating a process for performing a keyword search of audio data, according to some example embodiments.

As shown in FIG. 7, speakers 705A, 705B, and 705C participate in a meeting including a spoken discourse. In some embodiments, the meeting may occur entirely or partly via a remote connection (e.g., a video call). Additionally, fewer or additional speakers may be part of the meeting. The speech of the one or more speakers 705 is recorded as audio data. The collaborative content management system 130 identifies speakers based on the recorded audio data. In one example, speakers are identified by number (e.g., Speaker 1, Speaker 2, Speaker 3) and are later manually associated with names or other identifiers. In another example, the collaborative content management system 130 retains past audio profiles associated with users and automatically identifies speakers based on the recorded audio and the past audio profiles. In another example, speakers are identified based on names being spoken during the meeting.

In some embodiments, a collaborative content management system 130 (not included within FIG. 7) is accessed via a mobile phone (such as mobile phone 708 of FIG. 7), a laptop computer, a microphone system, or another device capable of recording audio. The collaborative content management system 130 records the audio data associated with the meeting, for instance in response to a request from a user to record the meeting. For example, a collaboration document within the collaborative content management system 130 can include an audio capture graphical interface element that, when interacted with, causes audio data to be recorded by the mobile device 708. In other embodiments, external software or an external device is used to record audio data from the meeting between the one or more speakers 705, and the recorded audio data is subsequently uploaded to the collaborative content management system 130. The audio data is stored as an audio file 710 by the collaborative content management system 130 in association with a collaboration document. The document may contain additional content items, such as spreadsheets, figures, text, and so forth.

An audio to text transcription process, as described above, is used to generate a text transcript 720 representative of the captured audio data. Words and phrases in the text transcript 720 are associated with timestamps in the audio file 710 that correspond to the portion of the audio data representative of the words and phrases. In some embodiments, the collaborative content management system 130 stores the text transcript 720 within an existing collaboration document associated with the audio file 710. The text transcript 720 can be accessed and modified by users with access to the document. Users with access to the document can additionally submit a search query 715 via an interface in the collaboration document. Upon receiving the search query 715, the collaborative content management system 130 can perform a full document search (i.e., a search of the text transcript, of text included elsewhere within the collaboration document, and the like). The collaborative content management system 130 can return search results, some of which include portions of the text transcript that corresponding to portions of the audio data. In other embodiments, the collaborative content management system 130 can provide results in response to receiving the search query 715 associated only with the text transcript of the transcribed audio data. In the example shown in FIG. 7, the search query 715 is a word ("Neapolitan"). In other examples, search queries 715 may be shorter or longer text segments, such as partial words, phrases, or sentences, or may identify a speaker name.

In response to receiving the search query 715, the collaborative content management system 130 identifies portions of the text transcript that correspond to the query. In some embodiments, the collaborative content management system 130 identifies corresponding portions of the text transcript based on matching the text of the search query or variants of the text of the search query to portions of the text transcript. In an example where the search query identifies a speaker's name, the collaborative content management system 130 identifies portions of the text transcript that correspond to speech by the identified speaker or to mentions of the speaker's name by other speakers. The collaborative content management system 130 causes the display of a list or set of search results 725 within a search results interface of the collaborative content management system 130. In the example of FIG. 7, two search results 725 are displayed: "RYAN: What flavor do you eat first in Neapolitan ice cream?" and "TOREY: I don't know, I don't eat Neapolitan." In some embodiments, each search result 725 is formatted to include a link to a location of the search result within the text transcript included within the document. In other embodiments, portions of the search results 725 including text of the search query 715 may be formatted (e.g., by bolding, highlighting, or underlining the result) to emphasize the search query text within each search result. For example, in the example of FIG. 7, the search term "Neapolitan" is bolded within each search result.

Search results that correspond to the text transcript can be associated with an audio playback graphical interface element 730. In some embodiments, an audio playback element 730 is displayed next to or in conjunction with an associated search result, and may be interacted with by a user viewing the search results 725. The audio playback element 730 is associated with a portion of the captured audio data 710 representative of the associated search result text. When selected, the audio playback element 730 accesses and causes playback of the associated portion of the captured audio data. For example, as shown in FIG. 7, an audio playback element 730A corresponds to the first search result ("RYAN: What flavor do you eat first in Neapolitan ice cream?") and an audio playback element 730B corresponds to the second search result ("TOREY: I don't know, I don't eat Neapolitan.") generated by the search query 715 ("Neapolitan"). The first audio playback element 730A corresponds to a portion of the audio data 735A, and the second audio playback element 730B corresponds to a portion of the audio data 735B. In a case where the second audio playback element 730B is selected, the collaborative content management system 130 accesses the corresponding portion of the audio data 735B and causes playback of the audio data to the querying user. For instance, the audio data 735B includes speech spoken by Torey saying "I don't know, I don't eat Neapolitan."

Figure 8:
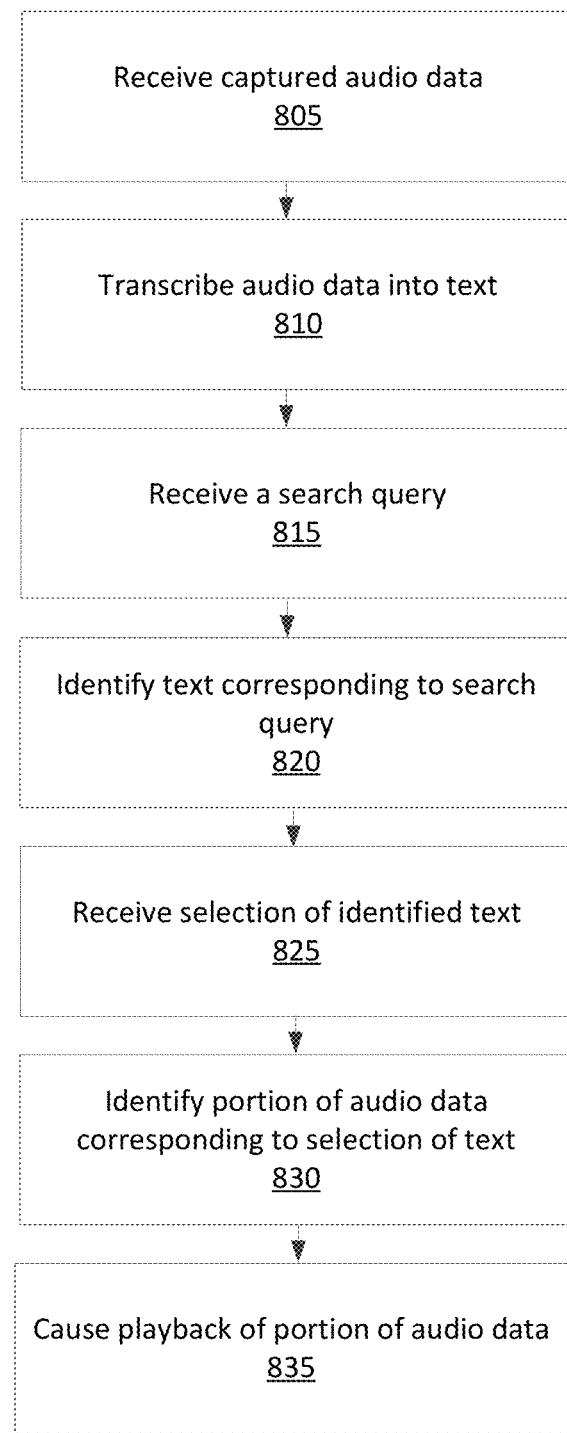
FIG. 8 shows an example flow chart illustrating a method for audio capture, search, and playback.

FIG. 8 is an example flow chart illustrating a method for audio capture, search, and playback. The collaborative content management system 130 receives 805 captured audio data, which may be recorded by or uploaded to the collaborative content management system 130. The captured audio data is transcribed 810 into text, producing a document including a text transcription of the audio file. The text document is indexed such that words or phrases in the text transcription correspond to portions of the audio representative of the words or phrases. The collaborative content management system 130 receives 815 a search query from a user of the collaborative content management system 130 with access to the document. Based on the search query, the collaborative content management system 130 identifies 820 text portions corresponding to the search query and receives 825 a user selection of an identified text portion. Based on the selection of the text portion, the collaborative content management system 130 identifies 830 portions of audio data that correspond to the selected text portion. The selection text portion and the corresponding portions of audio data are presented to the user, and, when selected, cause playback of the portion of audio data 835 associated with the selection text portion.

Automated Summary Generation of Captured Meeting Audio

Meeting audio for meetings between two or more people frequently contain extraneous information, making it difficult to quickly access key points and topics of the meeting. Summaries or outlines make important information (such as deadlines, assignments, and decisions) more accessible to users. However, manually generated summaries or outlines may be time consuming to create, unreliable, or inconsistent in quality. Providing an interface to automatically generate a meeting summary or modify a document by, at least in part, identifying hot words that correspond to actions streamlines the process of creating a meeting summary and allows users to efficiently perform actions within a collaborative document by voice command alone.

Figure 9:
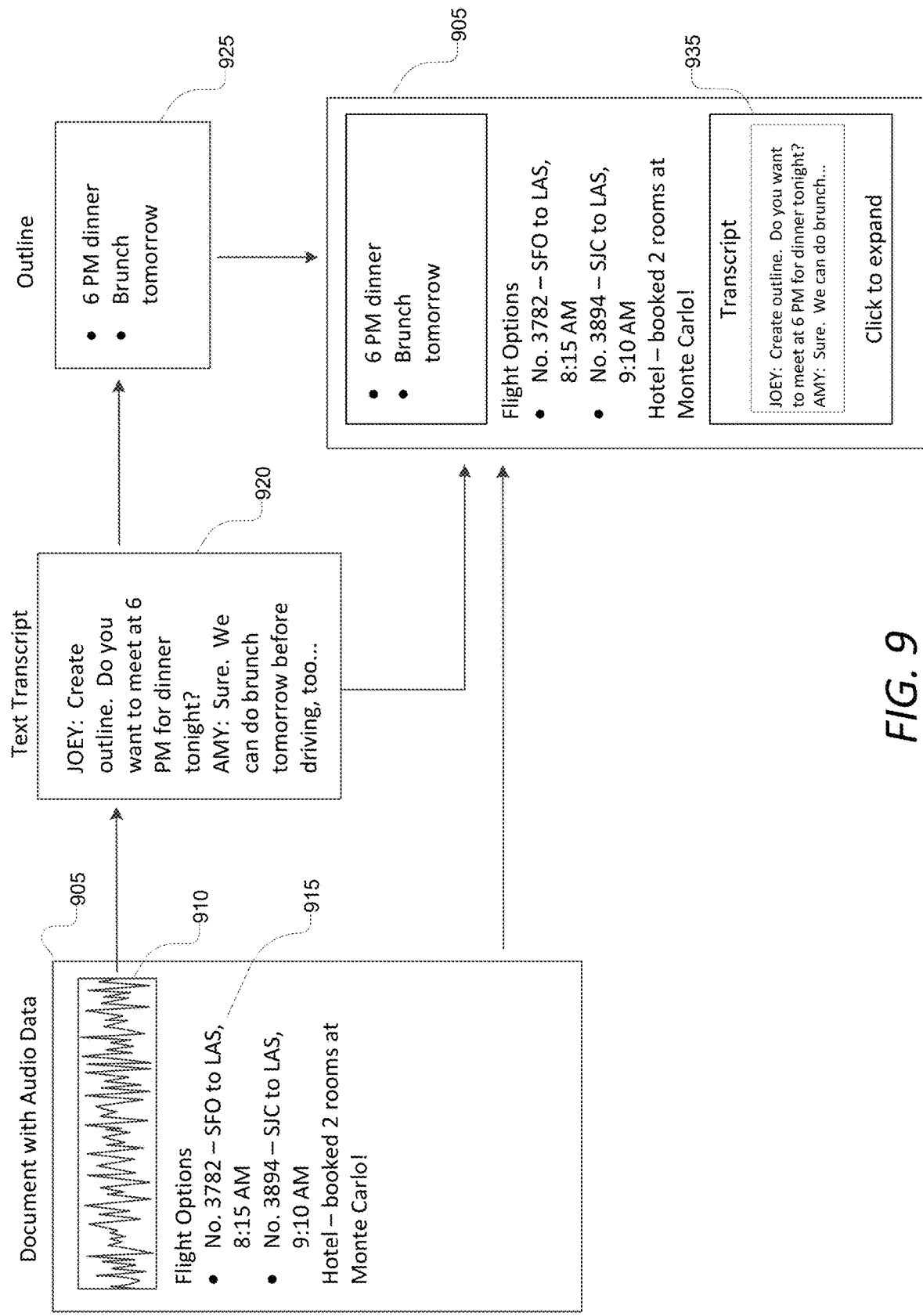
FIG. 9 shows an example illustrating the generation and incorporation of a meeting summary into a document.

FIG. 9 is an example illustrating the generation and incorporation of a meeting summary into a document.

A collaborative document 905 includes audio data 910 representing speech of one or more speakers. The audio data 910 may be recorded by the collaborative content management system 130, uploaded from an external source, and/or stored in conjunction with the collaborative document 905 (for instance, within metadata of the collaborative document, within a same folder as the collaborative document, and the like). In some embodiments, the audio data 910 is embedded into the collaborative document such that the collaborative content management system 130 must access the document 905 in order to access the audio data 910. The collaborative document 905 may additionally contain other objects, such as images, charts, spreadsheets, or text 915 as shown. The additional objects may or may not relate to the subject matter or contents of the audio data (e.g., by topic, by date created or added to the document).

The collaborative content management system 130 uses an audio to text transcription process, as described above, to generate a text transcript 920 representative of the audio data. In some embodiments, the collaborative content management system 130 embeds the text transcript 920 within the collaborative document 905 associated with the audio file 910. As shown in FIG. 9, the embedded transcript 935 may be labeled for clarity and formatted to fit within an allotted space at a location in the collaborative document 905. In one example, the collaborative content management system 130 labels the text transcript 920 (e.g. as "transcript," with an associated date or timestamp). In another example, the text transcript 920 may include information identifying the one or more speakers associated with each portion of the audio data 910. In another example, the transcript is embedded within the collaborative document 905 (for instance, at the bottom of the collaborative document), such that only a portion of the transcript 920 and an expand interface element are visible upon accessing the collaborative document. When a viewing user with access to the document 905 interacts with the interface element, the element expands to display the full embedded transcript 920 within the document.

Based on the generated text transcript 920, the collaborative content management system 130 identifies a portion of text associated with a "create outline" action to generate a text outline 925. The text outline 925 identifies main points and topics of the text transcript 920. In some embodiments, the collaborative content management system 130 identifies main points and topics of the text transcript 920 for inclusion in the outline 925 by identifying common or pre-determined keywords or hot words within the text transcript, times and dates within the text transcript, deadlines within the text transcript, conclusions and resolutions reached within the text transcript, assignments made, and the like. For example, the text transcript 920 shown in FIG. 9 including "JOEY: Create outline. Do you want to meet at 6 PM for dinner tonight? AMY: Sure. We can do brunch tomorrow before driving, too . . . " is used to generate a text outline including the objects "6 PM dinner" and "Brunch tomorrow." In another example, a text transcript can include the text "Chris: I am going to have Clark take over Rosemary's account", and the assignment outline object "Clark taking over Rosemary's account" is included in the outline. In yet another example, the text transcript can include the text:

Anne: Does anyone have any vacation ideas?
Rajiv: How about Mexico? It is nice this time of year.
Antonia: I've been wanting to go to Spain for a long time.
Toney: You can't get good Irish whiskey in either of those places.

In this example, the itinerary outline object "Vacation ideas: Mexico, Spain, Ireland" can be generated based on the keywords "vacation ideas", "Mexico", and "Spain", and the inferred keyword "Ireland" (inferred based on the phrase "Irish whiskey" in the context of vacation locations). It should be noted that outline objects can further include an identity of a meeting participant or speaker associated with the outline object (for instance, by including the text of participant's name in an outline object, or by tagging the participant in the outline object).

The collaborative content management system 130 modifies the collaborative document 905 to incorporate the generated text outline 925 at a first location within the document 905. For example, the text outline is embedded at the top of the collaborative document above contents of the collaborative document, as shown in FIG. 9. In some embodiments, objects in the text outline are additionally associated with audio playback elements displayed in conjunction with or next to the objects. When selected, the audio playback element accesses and causes playback of a portion of the captured audio data 910 associated with the outline objects. In other embodiments, the text outline 925 may associate outline objects with a link that, when selected, navigates a user to a location in the embedded text transcript 935 where text corresponding to the outline object appears. In some embodiments, as shown in FIG. 9 and described above, the collaborative content management system 130 recognizes inferred keywords or variations on pre-determined keywords or hot words when identifying actions to take or generating outlines. For example, the collaborative content management system 130 may identify singular and plural forms of words (e.g., "invite a person" and "invite people" when triggering an action to add users to a document) and related words (e.g., "Irish" to "Ireland" as in the example above) as functionally interchangeable.

The generated text outline 925 can be modifiable by users with access to the collaborative document 905 in which the outline is embedded. Users may add, edit, or delete objects within the text outline 925. Additionally, users may add comments, format objects (e.g., by highlighting, bolding, underlining, or italicizing words or phrases), tag other users within the outline, or otherwise modify the generated outline 925. Modifications are incorporated by the collaborative content management system into the generated outline 925 and are displayed to other users with access to the document 905. In some embodiments, the collaborative content management system 130 tracks and formats modifications made by users. For example, the collaborative content management system 130 identifies a user responsible for an edit when incorporating the edit into the outline 925. It should be noted that in embodiments where the collaborative document 905 and the captured audio data are associated with a meeting, participants in the meeting may take notes or edit contents of the document during the meeting (such as contents 915), and that these changes to the document can be preserved and displayed, for instance below the generated outline 925 and above the text transcript 935.

In other embodiments, the collaborative content management system 130 identifies portions of text associated with additional actions or document modification. In one example, the identified portions of text are keywords or "hot words." Each identified hot word is associated with an action taken by the collaborative content management system 130 to modify the document. In some embodiments, hot words are predetermined, such that speaking a hot word triggers the performance of an associated action. For example, hot words may be predetermined by the collaborative content management system 130 based on words frequently used during meetings to identify important points (e.g., "deadline," "task," "assign") or words used to designate an action commonly performed by the collaborative content management system 130 (e.g., "share," "invite," "tag"). In other embodiments, hot words may be defined by users and manually associated with actions to be taken by the collaborative content management system 130 upon identifying the hot word in the audio data. In some embodiments, a set of hot words may trigger the performance of an action for any speaker in the audio data, while in other embodiments, certain hot words only trigger the performance of an action if a particular speaker speaks them (for instance, a manager, a meeting leader, a speaker with particular access privileges, and the like). The collaborative content management system 130 may identify manually defined hot words and associated actions (and in some embodiments, an identity of the speaker) on a per-document basis, or based on the identity, position, or access privileges of the document owner, meeting leader, or speaker within the audio data. Based on the actions associated with the identified hot words, the collaborative content management system modifies the collaborative document. The modified document is then displayed and can be accessed, viewed, and modified by users with access and modification permissions to the document. In some embodiments, as described above in conjunction with FIG. 9, the collaborative content management system 130 transcribes the captured audio data into text representative of the speech. When hot words are identified in the audio data, the collaborative content management system 130 modifies the collaborative document to generate a text outline of the captured audio data. In other embodiments, a hot word is associated with an action to generate a summary for at least a portion of the audio data. When a hot word is identified, the collaborative content management system 130 generates at least a portion of a text outline summarizing the audio data corresponding to the hot word.

Some hot words are associated with actions that modify a collaborative document to include text, for instance identifying an action item, a decision made during the meeting, a task or project assignment, or other information. For example, the collaborative content management system 130 identifies a hot word in the audio data associated with an action item (such as the words "action item" or "to-do") and modifies the text of the collaborative document to include text identifying the action item. The modification may include additional information about the action item, such as one or more people associated with the action item, a due date, and a status. In cases where one or more people are associated with the action item, the collaborative content management system 130 may tag the users within the document. In another example, the collaborative content management system 130 identifies a hot word in the audio data associated with a task assignment (such as the words "assign to" or "assignment") and modifies the text of the collaborative document to include text identifying the assignment. As previously mentioned, the modification may include additional information such as a due date of the task or a user to which the task is assigned. In another example, the collaborative content management system 130 identifies a hot word in the audio data associated with a decision made during a meeting (such as the words "final decision" or simply "decision" or "decides") and modifies the text of the collaborative document to include text representative of the decision (for instance, in a bullet point within a meeting outline).

Some hot words are associated with actions that include a tag or a link within a collaborative document. For example, the collaborative content management system 130 identifies a hot word within the audio data associated with a tag action (such as "tag" or "include", followed by an identification of a user) and modifies the collaborative document by tagging an identified user within the document (for instance, a meeting participant, or someone that did not participate in the meeting but that a meeting participant wants to be able to access the collaborative document). In another example, the collaborative content management system 130 identifies a hot word within the audio data associated with a link action (such as "include link" or "hyperlink", followed by a link address) and modifies the collaborative document to include a link that (when interacted with) causes a direction to the link address within the collaborative document. In some embodiments, the link may lead to another document, object, network address, website, URL, or any other suitable destination.

Some hot words are associated with actions that alter the permissions associated with the collaborative document. For example, the collaborative content management system 130 identifies a hot word within the audio data associated with a share action (such as the words "share" or "grant permission") and modifies the permissions of the collaborative document based on the permissions and users identified in the speech associated with the hot word. For instance, a user might say "grant permission to Calvin to edit the document", and the user Calvin can be granted editing permissions for the document. In another example, a hot word within the audio data is associated with an invite action (such as the words "invite" or "add" followed by a user identity), and the collaborative content management system 130 can send an invite to the collaborative document to the identified user (and can also modify the access permissions of the collaborative document to allow the user to view or modify the document in response to the hot word).

In some embodiments, hot words can be used to modify a document after a meeting has completed. For instance, the collaborative content management system 130 can access audio data captured during a meeting after the conclusion of the meeting, can access a collaborative document associated with the meeting, and can modify the collaborative document based on hot words included within the audio data. In other embodiments, the collaborative content management system 130 can capture audio data and modify a collaborative document based on hot words within the audio data in real-time. For example, the collaborative content management system 130 can access a collaborative document associated with a meeting, and, during the course of the meeting, can add text to the document, tag users within the document, include text representative of task assignments within the document, and change access permissions for the document in response to detecting hot words spoken by one or more speakers during the meeting.

Figure 10:
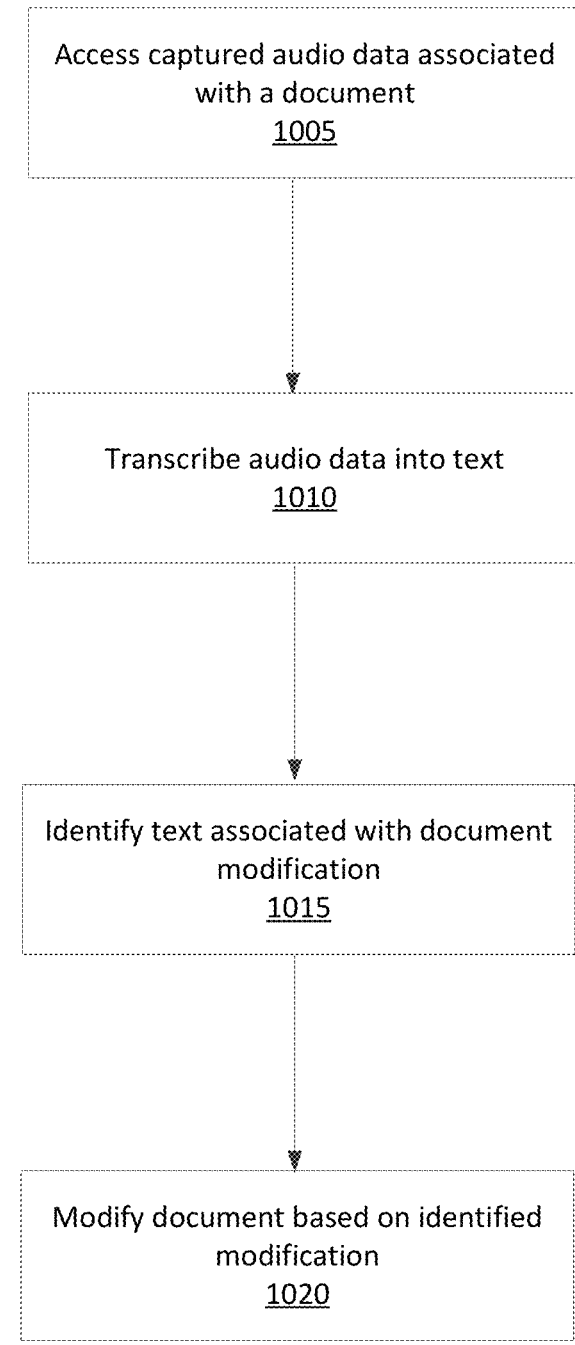
FIG. 10 shows an example flow chart illustrating a method for generating and incorporating a meeting summary into a document.

FIG. 10 is an example flow chart illustrating a method for modifying a document based on captured audio data. The collaborative content management system 130 accesses 1005 captured audio data associated with a document. The audio data may be recorded by the collaborative content management system 130 or uploaded from an external source by a user of the collaborative content management system 130. Using an audio to text transcription program as described above, the collaborative content management system 130 transcribes 1010 the audio data into text. Based on the text transcription, the collaborative content management system 130 identifies 1015 text in the text transcription associated with candidate document modifications and modifies 1020 the document based on the candidate document modifications associated with the identified text. A "candidate document modification", as used herein, is associated with a portion of text (such as a keyword, hot word, or phrase) and refers to a modification that, when the associated portion of text is identified within a text transcription, is performed on a document. In some embodiments, a text portion within the text transcription is associated with a modification rule that is associated with a document modification to be made when the modification rule is satisfied. For instance, a modification rule can indicate that when the text "to do" is detected within a text transcription, a corresponding document is to be modified to include the text "to do" along with an associated portion of the text transcription that follows the term "to do".

Meeting Transcription Using Custom Lexicons Based on Document History

As noted above, audio to text transcription relies on a lexicon to recognize words and sounds spoken within audio data. A lexicon is maintained by the text transcription program, and comprises a vocabulary of words or phrases mapped to representative sounds. In some embodiments, standard lexicons are organized based on the frequency at which words appear in a spoken language. As used herein, "standard lexicon" refers to a default lexicon used by a transcription system. However, because words may be used at differing frequencies depending on the context or speaker, it may be beneficial for the text transcription program to generate customized lexicons based on historic word usage. Custom lexicons enable a text transcription system to more accurately identify words or phrases that are frequently or uniquely used by a speaker or in a particular context that might otherwise be uncommon in a standard lexicon. As used herein, "custom lexicon" refers to a lexicon used by a transcription system for a corresponding subset of one or more users. While custom lexicons may be developed based on previously transcribed audio data, it is more comprehensive to develop a custom lexicon based on user documents in addition to audio data. By using documents saved to a content system such as spreadsheets, text documents, and others, the text transcription program has a great pool of data to mine in order to generate a customized lexicon for the user.

Figure 11:
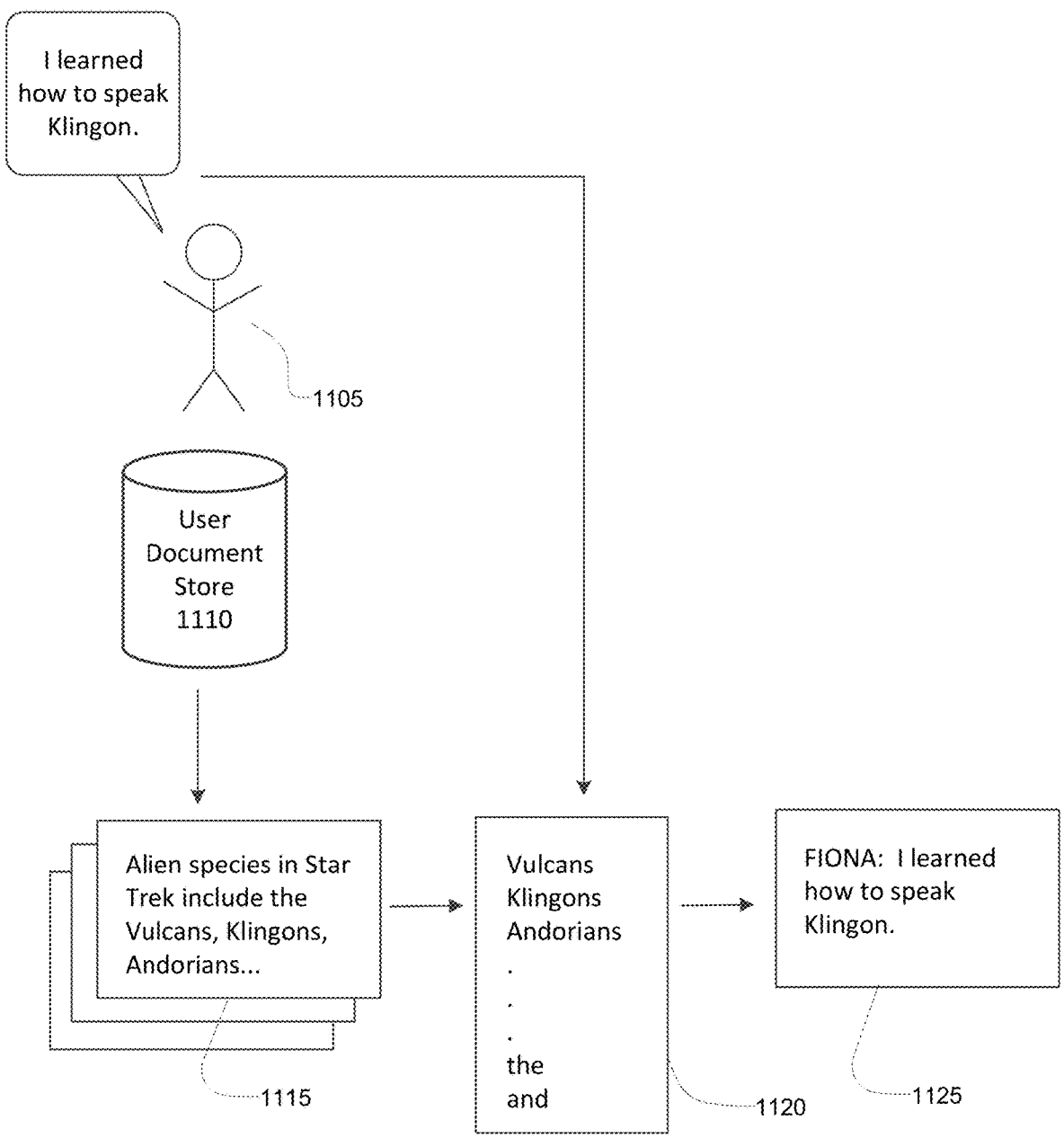
FIG. 11 shows an example illustrating the generation and application of a custom lexicon to create a meeting transcript.

FIG. 11 is an example illustrating the generation and application of a custom lexicon to create a meeting transcript.

As shown in FIG. 11, a user 1105 of the collaborative content management system 130 is associated with a user document store 1110. In some embodiments, the user document store 1110 includes collaborative documents that a user 1105 has permission to access or modify, for instance within the collaborative content management system 130, on one or more user devices, or at any other suitable location. For example, the user document store 1110 associated with a user 1105 may include documents created by the user, documents shared with the user by other users of the collaborative content management system 130, documents in which the user is tagged, documents in which the user has viewing or modifying permissions, documents the user has uploaded from a user device, documents the user has shared from another online account, and the like. The user documents 1115 can be spreadsheets, text documents, video or audio files, slideshows, images, or any other suitable document.

The collaborative content management system 130 accesses one or more documents 1115 stored in the user document store 1110 to generate a custom lexicon 1120 for the user 1105. The collaborative content management system 130 identifies words and phrases used frequently by the user 1105 based on text included within the accessed documents 1115. For example, the text can include raw text, image captions, text transcriptions of audio data, spreadsheet data, and other formatted or unformatted text contained within the user documents 1115. In some embodiments, the collaborative content management system 130 identifies words, n-grams, and phrases included within the set of user documents 1110 that aren't otherwise included within a default lexicon, and includes the words, n-grams, and phrases (mapped to corresponding sounds) within the default lexicon to create the custom lexicon. In some embodiments, the collaborative content management system 130 adjusts an ordering of words within a default lexicon based on identified words, n-grams, and phrases from the set of user documents to prioritize words, n-grams, and phrases used more frequently by the user than expected and/or to de-prioritize words, n-grams, and phrases used less frequently by the user than expected. In some embodiments, the collaborative content management system 130 generates a custom lexicon based on words, n-grams, and phrases included within the accessed set of user documents. In such embodiments, the collaborative content management system 130 can first attempt to generate a text transcript for a user's speech using the custom lexicon associated with the user, and can secondarily use a default lexicon for words, n-grams, and phrases not included in the custom lexicon.

When the collaborative content management system 120 receives audio data to be transcribed into text, a custom lexicon 1120 can be selected based on an identity of one or more speakers within the audio data or based on a context of the audio data (such as an HR group meeting, or a recorded speech by a manager). The custom lexicon 1120 can then be used to more accurately recognize the words and phrases included within the received audio data, and in turn to generate a more accurate text transcript. As shown in FIG. 11, when the audio data corresponds to one speaker, the documents 1115 of the user document store 1110 associated with the user 1105 are used to generate a custom lexicon 1120 that is then used to generate a text transcript of the audio data. For instance, audio data associated with the user 1105 and representative of the phrase "I learned how to speak Klingon" is provided to the collaborative content management system 130 for transcription. The user 1105 is additionally associated with one or more user documents 1115 in which the words "Vulcans," "Klingons," and "Andorians" are used. The collaborative content management system 130 modifies a generic lexicon to include these terms from the one or more user documents 1115 to generate a custom lexicon 1120. Using the custom lexicon 1120, the collaborative content management system 130 generates a text transcript 1125 ("FIONA: I learned how to speak Klingon"). The collaborative content management system 130 can then cause display of the text transcript 1125 to the user 1105 in the collaborative document associated with the audio data. It should be noted that in some embodiments, after a speaker is identified, a pre-generated custom lexicon can be accessed and used to generate a text transcript (as opposed to generating a custom text transcript each time a text transcription operation is performed).

In other embodiments, the audio data received by the collaborative content management system 130 represents multiple speakers, one or more of which are associated with a user document store 1110. When multiple speakers are represented in the audio data (for example, as in audio data of a meeting), the collaborative content management system 130 uses documents associated with one or more of the speakers to generate a custom lexicon. In some embodiments, the collaborative content management system 130 accesses custom lexicons associated with each of the one or more speakers to produce a custom lexicon inclusive of vocabulary in each of the speakers' custom lexicons. In other embodiments, a custom lexicon is generated for the one or more speakers by selecting one custom lexicon representative of the meeting from among the custom lexicons associated with each of the one or more speakers. For example, the collaborative content management system 130 may select a custom lexicon associated with one speaker based on the subject matter of the audio data, one or more characteristics of the one or more speakers, a size of vocabulary associated with each custom lexicon, or based on any other suitable factor. In other embodiments, a custom lexicon is generated for the one or more speakers based on a selected set of documents. The set of documents may be selected from the user document stores of the one or more speakers. For example, the collaborative content management system 130 may generate a custom lexicon based on documents accessible to each of the one or more speakers, documents selected by a speaker of the one or more speakers, documents associated with a subject matter of the audio data, documents associated with a meeting leader, or based on any other suitable criteria. In another example, the collaborative content management system 130 may generate a custom lexicon based on a union of documents stored within an account associated with each speaker of the one or more speakers.

In some embodiments in which the audio data is captured during a meeting with one or more speakers, the subject matter and/or characteristics of the meeting may be used to select a set of documents from which to generate a custom lexicon. For example, documents may be selected from the user document stores of one or more speakers based on the documents corresponding to a subject of the meeting.

In some embodiments, a second custom lexicon may be generated in response to a first custom lexicon not including a word or phrase corresponding to a portion of audio data. The second custom lexicon may be generated based on a second set of documents, selected as described above. In some embodiments, the second set of documents is associated with a second subset of the speakers represented in the audio data different from the subset of speakers used to generate the first custom lexicon. The second custom lexicon is then used by the collaborative content management system 130 to transcribe the audio data.

It should be noted that in some embodiments, a custom lexicon is generated for each speaker within audio data, and the collaborative content management system 130 selects among the custom lexicons for use in transcribing the audio data based on an identity of the speaker. For instance, a first custom lexicon associated with a first speaker can be used to transcribe audio of the first speaker saying "Did you go see Blink 182 this weekend" and a second custom lexicon associated with a second speaker can be used to transcribe audio of the second speaker responding "No, I went to the Reel Big Fish concert instead".

Figure 12:
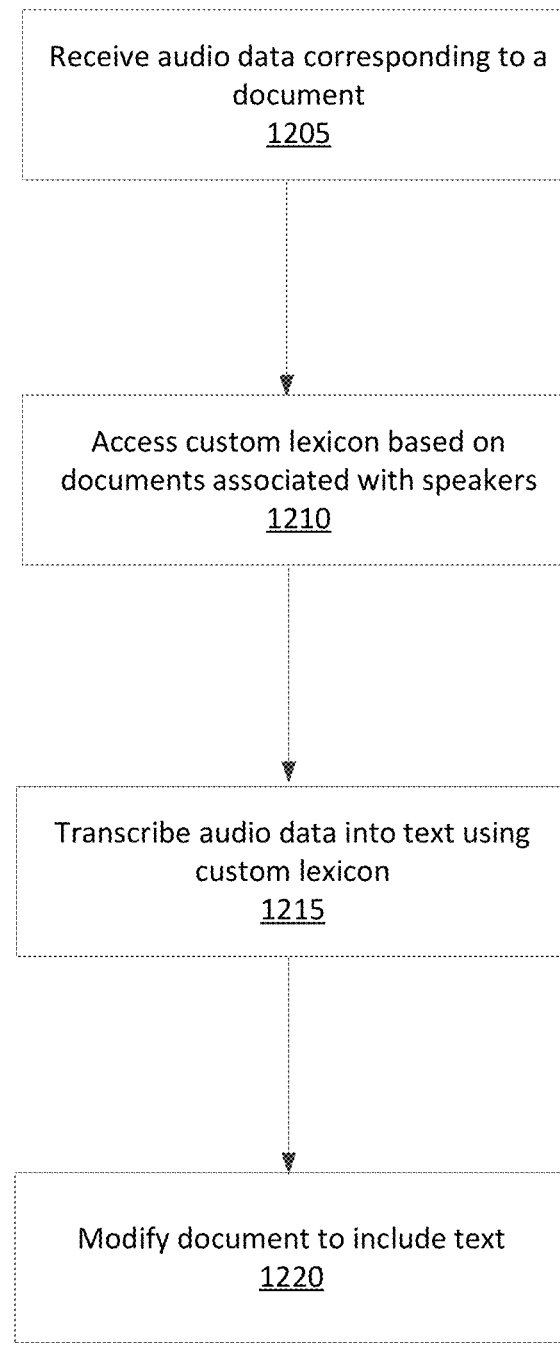
FIG. 12 shows an example flow chart illustrating a method for generating a text transcript using a custom lexicon based on document history.

FIG. 12 is an example flow chart illustrating a method for generating a text transcript using a custom lexicon based on document history. The collaborative content management system 130 receives 1205 audio data corresponding to a document. The audio data may be recorded by the collaborative content management system 130 (for instance, during a meeting) or uploaded from an external source. The document may additionally include other content objects such as spreadsheets, images, plain text, charts, and others. The collaborative content management system 130 accesses 1210 a custom lexicon generated based on documents associated with one or more speakers in the audio data. Using the custom lexicon, the collaborative content management system 130 transcribes 1215 the audio data into text and modifies 1220 the document associated with the audio data to include the text transcript.

Additional Considerations

Reference in the specification to "one embodiment" or to "an embodiment" means that a particular feature, structure, or characteristic described in connection with the embodiments is included in at least one embodiment. The appearances of the phrase "in some embodiments" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific embodiments and implementations for illustration, but various modifications can be made without deviating from the scope of the embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
    receiving, by a content creation system, audio data including speech of a plurality of speakers, each speaker of the plurality of speakers included in the audio data, the audio data corresponding to a collaborative document;
    responsive to receiving the audio data, accessing a custom lexicon that is generated by:
        identifying, by the content creation system, a respective account for each speaker of the plurality of speakers, each respective account associated with one or more documents stored by the content creation system, each document of the one or more documents associated with information identifying a set of accounts as collaborators having accessed the document,
        determining, by the content creation system, a plurality of collaborative documents on which each speaker is a collaborator based on the information identifying the set of accounts as collaborators, each collaborative document of the plurality of collaborative documents having been determined for inclusion in the plurality of collaborative documents based on it being stored in association with accounts of all of the plurality of speakers, the plurality of collaborative documents each having one or more content level comments that are annotated in visual association with one or more text spans but displayed in an interface separate from the one or more text spans, and
        generating, by the content creation system for the plurality of speakers, the custom lexicon based on the plurality of collaborative documents on which each speaker is a collaborator;
    transcribing, by the content creation system, the audio data into text representative of the speech using the custom lexicon; and
    modifying, by the content creation system, the collaboration document to include the text representative of the speech.

2. The computer-implemented method of claim 1, wherein generating the custom lexicon comprises:
    identifying, by the content creation system, a set of words or n-grams included within the plurality of collaborative documents; and
    modifying, by the content creation system, a default lexicon to include the identified set of words or n-grams to generate the custom lexicon.

3. The computer-implemented method of claim 1, wherein generating the custom lexicon for the plurality of speakers comprises selecting among a plurality of lexicons associated with each speaker of the plurality of speakers based on a subject matter of the audio data.

4. The computer-implemented method of claim 1, wherein generating the custom lexicon for the plurality of speakers comprises selecting among a plurality of lexicons associated with each speaker of the plurality of speakers based on one or more characteristics of the one or more speakers.

5. The computer-implemented method of claim 1, wherein the set of documents is accessible to each of the plurality of speakers.

6. The computer-implemented method of claim 1, wherein each document of the plurality of collaborative documents is stored within an account of one or more of the plurality of speakers.

7. The computer-implemented method of claim 1, wherein at least one document of the plurality of collaborative documents comprises the collaborative document.

8. The computer-implemented method of claim 1, wherein the set of documents is associated with a subject matter of the audio data.

9. The computer-implemented method of claim 1, wherein the set of documents is selected by a speaker of the plurality of speakers.

10. The computer-implemented method of claim 1, wherein the audio data is captured during a meeting.

11. The computer-implemented method of claim 10, wherein the set of documents is selected based on a characteristic of the meeting.

12. The computer-implemented method of claim 1, wherein a second custom lexicon is accessed in response to the custom lexicon not including text associated with a spoken word.

13. The computer-implemented method of claim 12, wherein the second custom lexicon is generated based on a second set of documents.

14. A system comprising:
one or more processors; and
a non-transitory computer-readable storage medium storing executable instructions that, when executed by the one or more processors, cause the system to perform steps comprising:
receiving, by a content creation system, audio data including speech of a plurality of speakers, each speaker of the plurality of speakers included in the audio data, the audio data corresponding to a collaborative document;
responsive to receiving the audio data, accessing a custom lexicon that is generated by:
identifying, by the content creation system, a respective account for each speaker of the plurality of speakers, each respective account associated with one or more documents stored by the content creation system, each document of the one or more documents associated with information identifying a set of accounts as collaborators having accessed the document,
determining, by the content creation system, a plurality of collaborative documents on which each speaker is a collaborator based on the information identifying the set of accounts as collaborators, each collaborative document of the plurality of collaborative documents having been determined for inclusion in the plurality of collaborative documents based on it being stored in association with accounts of all of the plurality of speakers, the plurality of collaborative documents each having one or more content level comments that are annotated in visual association with one or more text spans but displayed in an interface separate from the one or more text spans, and
generating, by the content creation system for the plurality of speakers, the custom lexicon based on the plurality of collaborative on which each speaker is a collaborator;
transcribing, by the content creation system, the audio data into text representative of the speech using the custom lexicon; and
modifying, by the content creation system, the collaboration document to include the text representative of the speech.

15. The system of claim 14, wherein the custom lexicon includes a set of terms included within the plurality of collaborative documents and not included within a default lexicon.

16. A non-transitory computer-readable medium comprising memory with instructions encoded thereon that, when executed, cause one or more processors to perform operations, the instructions comprising instructions to:
receive, by a content creation system, audio data including speech of a plurality of speakers, each speaker of the plurality of speakers included in the audio data, the audio data corresponding to a collaborative document;
responsive to receiving the audio data, access a custom lexicon that is generated by:
identifying, by the content creation system, a respective account for each speaker of the plurality of speakers, each respective account associated with one or more documents stored by the content creation system, each document of the one or more documents associated with information identifying a set of accounts as collaborators having accessed the document,
determining, by the content creation system, a plurality of collaborative documents on which each speaker is a collaborator based on the information identifying the set of accounts as collaborators, each collaborative document of the plurality of collaborative documents having been determined for inclusion in the plurality of collaborative documents based on it being stored in association with accounts of all of the plurality of speakers, the plurality of collaborative documents each having one or more content level comments that are annotated in visual association with one or more text spans but displayed in an interface separate from the one or more text spans, and
generating, by the content creation system for the plurality of speakers, the custom lexicon based on the plurality of collaborative documents on which each speaker is a collaborator;
transcribe, by the content creation system, the audio data into text representative of the speech using the custom lexicon; and
modify, by the content creation system, the collaboration document to include the text representative of the speech.

17. The non-transitory computer-readable medium of claim 16, wherein the instructions to generate the custom lexicon comprise instructions to:
identify, by the content creation system, a set of words or n-grams included within the plurality of collaborative documents; and
modify, by the content creation system, a default lexicon to include the identified set of words or n-grams to generate the custom lexicon.

18. The non-transitory computer-readable medium of claim 16, wherein the instructions to generate the custom lexicon for the plurality of speakers comprise instructions to select among a plurality of lexicons associated with each speaker of the plurality of speakers based on a subject matter of the audio data.

19. The non-transitory computer-readable medium of claim 16, wherein the instructions to generate the custom lexicon for the plurality of speakers comprise instructions to select among a plurality of lexicons associated with each speaker of the plurality of speakers based on one or more characteristics of the one or more speakers.

* * * * *